(12) United States Patent
Lee et al.

(10) Patent No.: US 12,282,167 B2
(45) Date of Patent: Apr. 22, 2025

(54) ELECTRONIC DEVICE AND METHOD FOR OBTAINING MEDIA CORRESPONDING TO LOCATION BY CONTROLLING CAMERA BASED ON LOCATION

(71) Applicant: SAMSUNG ELECTRONICS CO., LTD., Suwon-si (KR)

(72) Inventors: Sanghun Lee, Suwon-si (KR); Jaewon Bang, Suwon-si (KR); Donghyun Yeom, Suwon-si (KR); Moonsoo Chang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/222,235

(22) Filed: Jul. 14, 2023

(65) Prior Publication Data

US 2024/0134195 A1 Apr. 25, 2024
US 2024/0231096 A9 Jul. 11, 2024

Related U.S. Application Data

(63) Continuation of application No. PCT/KR2023/009674, filed on Jul. 7, 2023.

(30) Foreign Application Priority Data

Oct. 20, 2022 (KR) .................. 10-2022-0135464
Oct. 25, 2022 (KR) .................. 10-2022-0138760

(51) Int. Cl.
*G02B 27/01* (2006.01)
*G06V 10/764* (2022.01)
(Continued)

(52) U.S. Cl.
CPC ....... *G02B 27/0172* (2013.01); *G06V 10/764* (2022.01); *G06V 20/44* (2022.01); *H04N 23/667* (2023.01)

(58) Field of Classification Search
CPC .. G02B 27/0172; G06V 10/764; G06V 20/44; H04N 23/667
See application file for complete search history.

(56) References Cited

U.S. PATENT DOCUMENTS 8,427,552 B2 4/2013 Marman et al.
8,949,324 B2 2/2015 Sako et al.
(Continued)

FOREIGN PATENT DOCUMENTS

CN 104599243 A 5/2015
JP 6987728 B2 1/2022
(Continued)

OTHER PUBLICATIONS

Xian, W., et al., "Space-time Neural Irradiance Fields for Free-Viewpoint Video", CVPR 2021, pp. 9421-9431, 11 pages. https://video-nerf.github.io.
(Continued)

*Primary Examiner* — Robert J Michaud
(74) *Attorney, Agent, or Firm* — Sughrue Mion, PLLC

(57) ABSTRACT

A processor of a wearable device may display, based on identifying a location in a first area based on data of a sensor, a visual object. The processor may be configured to adjust, based on an input indicating selection of the visual object, the state of the camera to a first state for recording media. The processor may be configured to identify whether the location of the wearable device moves to a second area in the first area. The processor may be configured to obtain, based on identifying that the location of the wearable device moves into the second area, media based on the camera of the first state. The present disclosure relates to a metaverse service for enhancing interconnectivity between a real-world object and a virtual object, and the metaverse service
(Continued)

may be provided over a network based on 5th generation (5G) and/or 6th generation (6G) communication systems.

20 Claims, 16 Drawing Sheets

(51) Int. Cl.
*G06V 20/40* (2022.01)
*H04N 23/667* (2023.01)

(56) References Cited

U.S. PATENT DOCUMENTS

| | | |
|---|---|---|
| 10,419,657 B2 | 9/2019 | Barnes et al. |
| 10,453,495 B2 | 10/2019 | Bellotti et al. |
| 11,245,872 B2 | 2/2022 | Yerli |
| 2013/0117377 A1 | 5/2013 | Miller |
| 2013/0222241 A1 | 8/2013 | Jeong |
| 2015/0022427 A1* | 1/2015 | Sako ............... H04N 23/63 345/8 |
| 2018/0060948 A1 | 3/2018 | Mattingly et al. |
| 2018/0343442 A1* | 11/2018 | Yoshikawa .......... H04N 21/438 |
| 2019/0073830 A1 | 3/2019 | Fujimoto et al. |
| 2020/0402315 A1 | 12/2020 | Yerli |

FOREIGN PATENT DOCUMENTS

| | | |
|---|---|---|
| JP | 7174785 B2 | 11/2022 |
| JP | 7492904 B2 | 5/2024 |
| KR | 10-2009-0086092 A | 8/2009 |
| KR | 10-2013-0097423 A | 9/2013 |
| KR | 10-1651472 B1 | 8/2016 |
| KR | 10-1661555 B1 | 10/2016 |
| KR | 10-1687309 B1 | 12/2016 |
| KR | 10-2180194 B1 | 11/2020 |
| KR | 10-2376526 B1 | 3/2022 |

OTHER PUBLICATIONS

International Search Report (PCT/ISA/210) issued Oct. 26, 2023 by the International Searching Authority in International Patent Application No. PCT/KR2023/009674.
Written Opinion (PCT/ISA/237) issued Oct. 26, 2023 by the International Searching Authority in International Patent Application No. PCT/KR2023/009674.

* cited by examiner

ELECTRONIC DEVICE AND METHOD FOR OBTAINING MEDIA CORRESPONDING TO LOCATION BY CONTROLLING CAMERA BASED ON LOCATION

CROSS-REFERENCE TO RELATED APPLICATION(S)

This application is a continuation of PCT International Application No. PCT/KR2023/009674, which was filed on Jul. 7, 2023, and claims priority to Korean Patent Application No. 10-2022-0135464, filed on Oct. 20, 2022, and claims priority to Korean Patent Application No. 10-2022-0138760, filed on Oct. 25, 2022, in the Korean Intellectual Property Office, the disclosure of which are incorporated by reference herein their entirety.

BACKGROUND

Technical Field

The present disclosure relates to an electronic apparatus for obtaining media corresponding to a location by controlling a camera based on the location, and a method thereof.

Description of Related Art

In order to provide an enhanced user experience, an electronic device for providing an augmented reality (AR) service displaying computer-generated information in association with an external object in a real-world is under development. Such an electronic device may be a wearable device that may be worn by a user. For example, the electronic device may include AR glasses and/or a head-mounted device (HMD).

SUMMARY

According to an embodiment, a wearable device includes a display, a camera, a sensor, a communication circuitry, and a processor. The processor may be configured to identify a location of the wearable device based on data output by the sensor. The processor may be configured to display, in a field-of-view (FoV) of the wearable device, a visual object for adjusting a state of the camera to a first state for recording media, by controlling the display, based on identifying that the location is included in a first area that is set by an external electronic device through the communication circuitry. The processor may be configured to adjust, based on an input indicating a selection of the visual object, the state of the camera to the first state. The processor may be configured to identify, based on the data from the sensor, whether the condition of the wearable device moves to a second area in the first area. The processor may be configured to obtain, based on identifying that the location of the wearable device moves into the second area, media associated with the second area based on the state of the camera being adjusted to the first state. The processor may be configured to transmit the obtained media to the external electronic device through the communication circuitry.

According to an embodiment, a method of a wearable device may include identifying a location of the wearable device based on data outputted from a sensor of the wearable device. The method may include displaying, in a field-of-view (FoV) of the wearable device by controlling a display of the wearable device based on identifying that the location is included in a first area that is set by an external electronic device through a communication circuitry of the wearable device, a visual object for adjusting a state of a camera to a first state for recording media. The method may include adjusting, based on an input indicating a selection of the visual object, the state of the camera to the first state. The method may include identifying, based on the data from the sensor, whether the location of the wearable device moves to a second area included in the first area. The method may include obtaining, based on identifying that the location of the wearable device moves into the second area, media associated with the second area based on the state of the camera being adjusted to the first state. The method may include transmitting the obtained media to the external electronic device through the communication circuitry.

According to an embodiment, an electronic device includes a communication circuitry, a memory, and a processor. The processor may be configured to obtain, from a plurality of external electronic devices based on a communication circuitry, first media with respect to an area and meta data corresponding to the first media. The processor may be configured to identify, based on the metadata, second media including an event occurred in the area among the first media. The processor may be configured to obtain, based on the second media, a third media including the event and including a field-of-view (FoV) different from one or more FoVs of the second media. The processor may be configured to store, in the memory, the third media based on a state that the third media is accessible to at least one of the plurality of external electronic devices.

According to an embodiment, a method of a wearable device may include obtaining, from a plurality of external electronic devices based on a communication circuitry of the electronic device, first media with respect to an area and meta data corresponding to the first media. The method may include identifying, based on the metadata, second media including an event occurred in the area among the first media. The method may include obtaining, based on the second media, a third media including the event and including a field-of-view (FoV) different from one or more FoVs of the second media. The method may include storing, in a memory of the electronic device, the third media based on a state that the third media is accessible to at least one of the plurality of external electronic devices.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
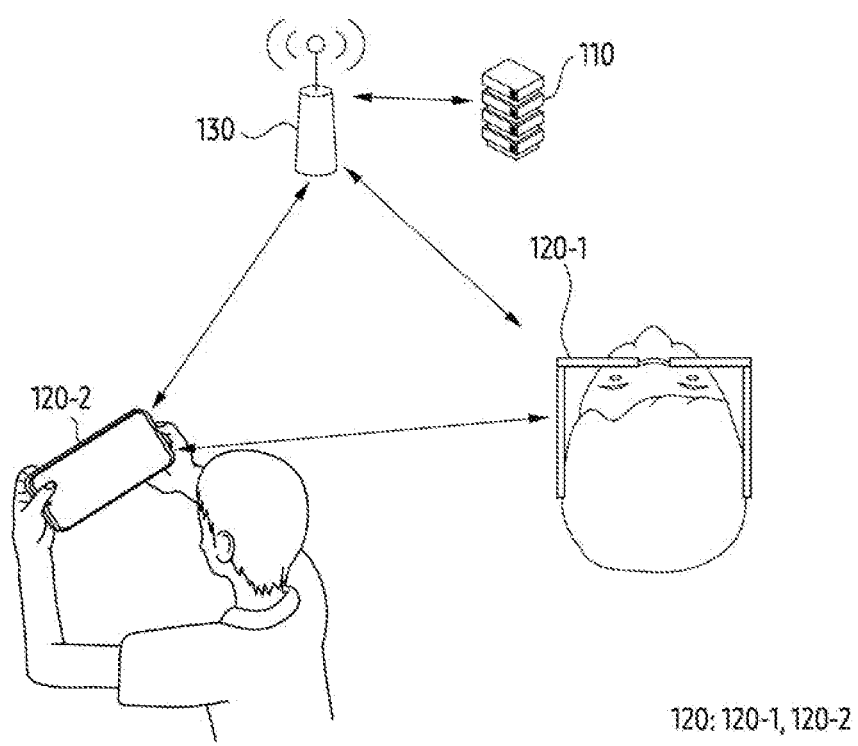
FIG. 1 is an exemplary diagram of an environment in which a metaverse service is provided through a server according to one or more embodiments.

Hereinafter, various embodiments of the disclosure will be described with reference to the accompanying drawings.

It should be appreciated that various embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic", "logic block", "part", "portion", or "circuitry". A module may be a single integral component, or a minimum unit or part thereof, adapted to perform one or more functions. For example, the module may be implemented in a form of an application-specific integrated circuit (ASIC).

A term "metaverse" is a compound word of the English words "Meta," which implies "virtual" or "beyond", and "Universe," which implies the universe, and refers to a three-dimensional (3D) virtual world where social, economic, and/or cultural activities like the real-world take place. The metaverse has a concept that has evolved one step further than the virtual reality (VR), which is a state-of-the-art technology that allows users to experience substantially the same as the real life in a virtual world created by a computer, and its feature resides in using avatars to not only enjoy games or virtual reality, but also engage in various social and cultural activities that are similar to those in real life.

Such a metaverse service may be provided in at least two forms. The first is to provide the Metaverse service to the user using the server, and the second is to provide the Metaverse service by means of individual contacts between the users. Recitation of the term "metaverse" is not limited to any known commercial usage of this term.

FIG. 1 is an exemplary diagram illustrating a first embodiment of an environment 101 in which a metaverse service is provided through a server 110.

Referring to FIG. 1, the environment 101 according to a first embodiment includes a server 110 providing a metaverse service, a network (e.g., a network formed by at least one intermediate node 130 including an access point (AP) and/or a base station) connecting the server 110 with each user terminal (e.g., a user terminal 120 including a first terminal 120-1 and a second terminal 120-2), and the user terminal that may have access to the server over the network to input and output information into/from the metaverse service, thereby allowing the user to utilize the metaverse service.

In this context, the server 110 provides a virtual space so that the user terminal 120 may perform activities in the virtual space. Further, the user terminal 120 may include a S/W agent for accessing the virtual space provided by the server 110 to express the information the server 110 provides to the user or transmit the information the user wants to express in the virtual space to the server. For example, the S/W agent may provide a view portal that enables a user to view the virtual space and select, add, or delete one or more virtual objects included in the virtual space.

The S/W agent may be provided directly through the server 110, downloaded from a public server, or embedded when purchasing a terminal.

Figure 2:
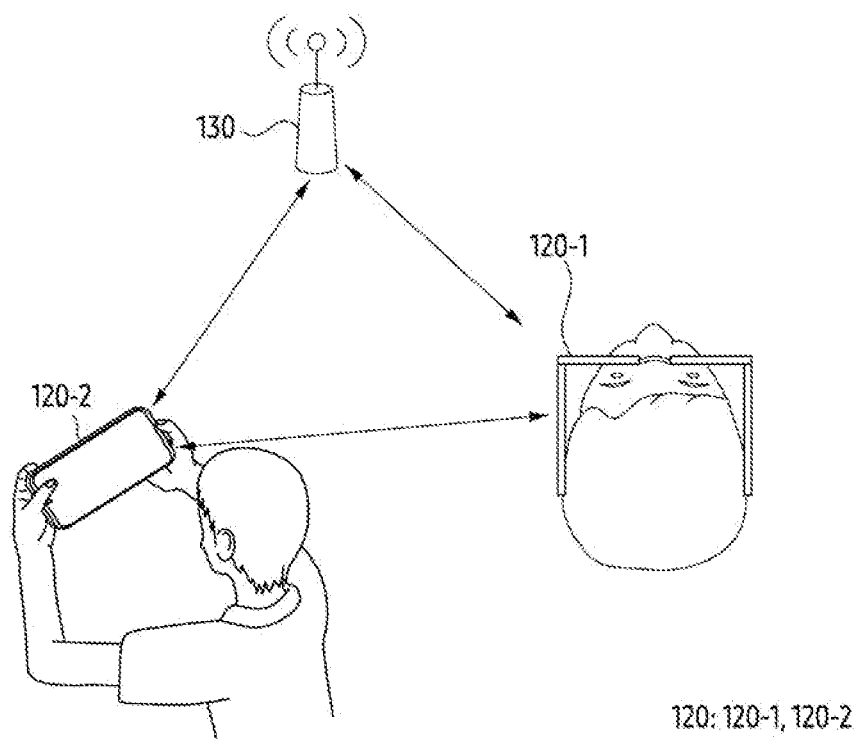
FIG. 2 is an exemplary diagram of an environment which a metaverse service is provided through direct connection between user terminals and a second terminal according to one or more embodiments.

FIG. 2 is an exemplary diagram illustrating a second embodiment of environment 102 in which a metaverse service is provided through direct connection of user terminals (e.g., the first terminal 120-1 and the second terminal 120-2).

Referring to FIG. 2, the second embodiment of environment 102 includes a first terminal 120-1 providing a metaverse service, a network (e.g., a network formed by at least one intermediate node 130) connecting each user terminal, and a second terminal 120-2 connecting to the first terminal 120-1 through the network to allow a second user to use the metaverse service by making input and output into/from the metaverse service.

According to the second embodiment, the first terminal 120-1 acts as a server (e.g., the server 110 of FIG. 1) in the first embodiment to provide a metaverse service. That is to say, it can be seen that the metaverse environment may be configured only with a device-to-device connection.

In the first embodiment and the second embodiment, the user terminals 120 (or the user terminals 120 including the first terminal 120-1 and the second terminal 120-2) may be made of various form factors, and may include an output device for providing an image and/or sound to a user and an input device for inputting information to a metaverse service. For example, various form factors of the user terminal 120 may include a smartphone (e.g., the second terminal 120-2), an AR device (e.g., the first terminal 120-1), a virtual reality (VR) device, a mixed reality (MR) device, a video see-through (VST) device, a television or projector capable of input and output, or any other suitable device known to one of ordinary skill in the art.

The network (e.g., the network formed by at least one intermediate node 130) of the disclosure encompasses various broadband networks including 3G, 4G, and 5G and short-range networks including Wireless Fidelity (Wi-Fi) and Bluetooth (e.g., a wired or wireless network directly connecting the first terminal 120-1 and the second terminal 120-2).

Figure 3A:
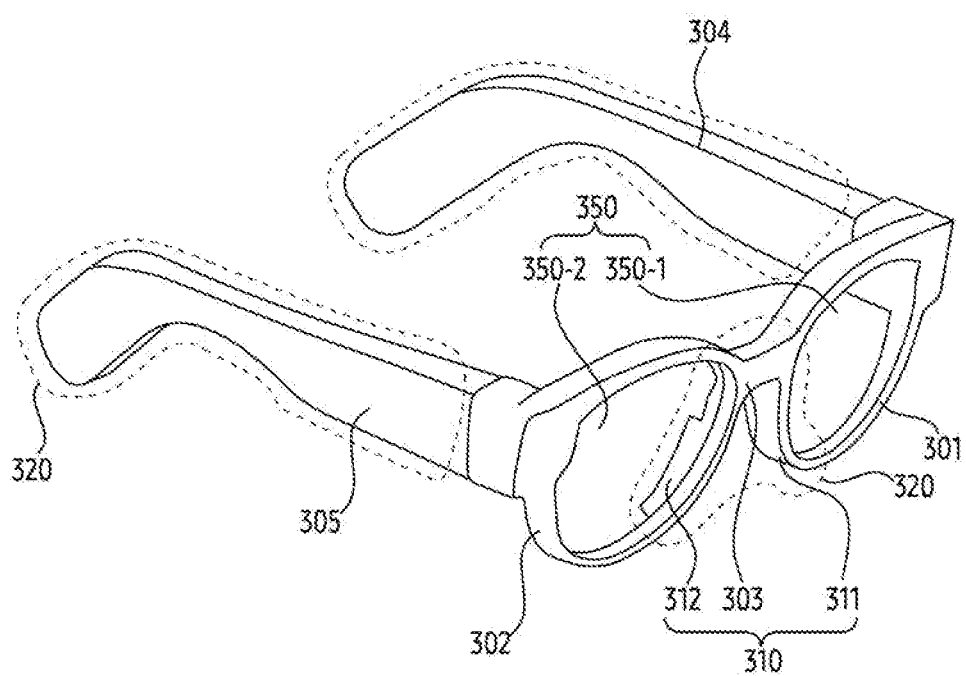
FIG. 3A illustrates a perspective view of an example wearable device according to one or more embodiments.
Figure 3B:
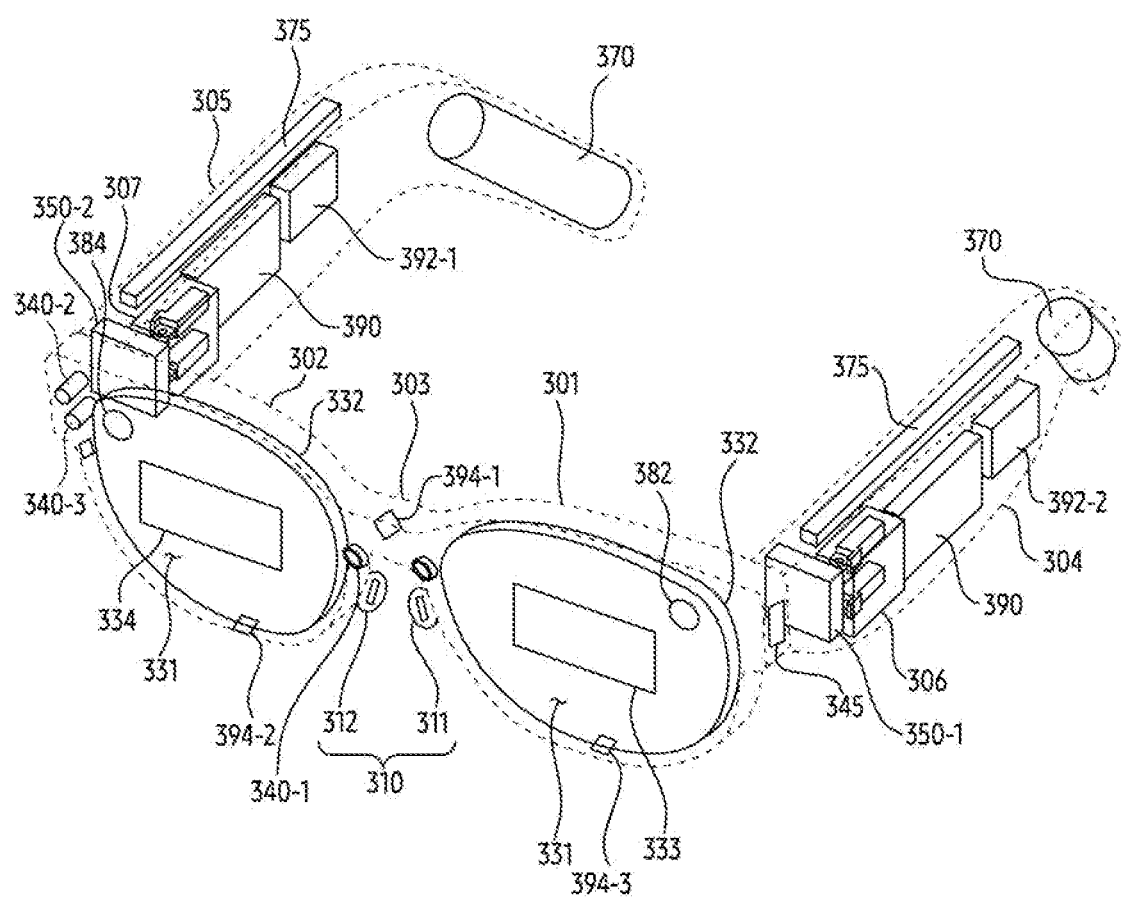
FIG. 3B illustrates an example of one or more hardware elements disposed in a wearable device according to one or more embodiments.

FIG. 3A illustrates a perspective view of an example wearable device 300 according to an embodiment. FIG. 3B illustrates an example of one or more hardware elements disposed in a wearable device 300 according to an embodiment. The wearable device 300 of FIGS. 3A and 3B may include the first terminal 120-1 of FIGS. 1 and 2. According to an embodiment, as shown in FIG. 3A, the wearable device 300 may include at least one display 350 and a frame supporting the at least one display 350. In one or more examples, the display 350 may be positioned to correspond to a user's line of eyesight.

According to an embodiment, the wearable device 300 may be worn on a part of a user's body. The wearable device 300 may provide augmented reality (AR), virtual reality (VR), or mixed reality (MR) in which the augmented reality and the virtual reality are mixed, to a user wearing the wearable device 300. For example, the wearable device 300 may output a virtual reality image to the user through the at least one display 350, in response to a preset gesture of the user obtained through a motion recognition camera 340-2 of FIG. 3B.

According to an embodiment, the at least one display 350 in the wearable device 300 may provide visual information to the user. For example, the at least one display 350 may include a transparent or translucent lens. The at least one display 350 may include a first display 350-1 and/or a second display 350-2 spaced apart from the first display 350-1. For example, the first display 350-1 and the second display 350-2 may be disposed at positions corresponding to the left eye and the right eye of the user, respectively. The first display 350-1 and the second display 350-2 may display duplicate images, or may display different images.

Referring to FIG. 3B, the at least one display 350 may form a display area on a lens to provide a user wearing the wearable device 300 with visual information included in external light passing through the lens, together with other visual information distinct from the visual information. The lens may be formed based on at least one of a Fresnel lens, a pancake lens, or a multi-channel lens. The display area formed by the at least one display 350 may be formed on a second surface 332 of a first surface 331 and the second surface 332 of the lens. When the user wears the wearable device 300, the external light may be incident on the first surface 331 and then transmitted through the second surface 332 to be transferred to the user. As another example, the at least one display 350 may display a virtual reality image to be coupled to a real world screen transmitted through the external light. For example, if a navigation application is being used, the directions (e.g., arrows, markers, etc.) may be overlaid on real world objects the user is currently viewing. The virtual reality image output from the at least one display 350 may be transmitted to the eyes of the user through one or more hardware elements (e.g., optical devices 382 and 384, and/or one or more waveguides 333 and 334) included in the wearable device 300.

According to an embodiment, the wearable device 300 may include waveguides 333 and 334 configured to diffract light transmitted from the at least one display 350 and relayed by the optical devices 382 and 384 to transmit the diffracted light to the user. The waveguides 333 and 334 may be formed based on at least one of glass, plastic, or polymer. Nano-patterns may be formed on at least a portion of the outside or the inside of the waveguides 333 and 334. The nano-pattern may be formed based on a polygonal and/or curved shape of grating structure. Light incident on one end of the waveguides 333 and 334 may be propagated to the other end of the waveguides 333 and 334 by the nano-pattern. The waveguides 333 and 334 may include at least one of diffractive element (e.g., a diffractive optical element (DOE), a holographic optical element (HOE)), or a reflective element (e.g., a reflective mirror). For example, the waveguides 333 and 334 may be disposed in the wearable device 300 to guide a screen displayed by the at least one display 350 to the eyes of the user. For example, the screen may be transmitted to the user's eyes, based on total internal reflection (TIR) generated in the waveguides 333 and 334.

According to an embodiment, the wearable device 300 may analyze an object contained in a real world image collected through a photographing camera 340-1 and combine a virtual object corresponding to the object to be provided with augmented reality of the analyzed objects, thereby displaying the combined virtual object on the at least one display 350. The virtual object may include at least one of text and an image for various information related to the object included in the real world image. For example, if the user is looking at an item while shopping in the store, a price or information about the item may be displayed through the first and/or second display while the user is looking at the item. The wearable device 300 may analyze the object based on a multi-camera such as a stereo camera. To analyze the object, the wearable device 300 may execute Time-of-Flight (ToF) and/or Simultaneous Localization and Mapping (SLAM) supported by the multi-camera. A user wearing the wearable device 300 may watch an image displayed on the at least one display 350.

According to an embodiment, the frame may have a physical structure that the wearable device 300 may be worn on the user's body. According to an embodiment, when the user is wearing the wearable device 300, the frame may be configured such that the first display 350-1 and the second display 350-2 are positioned corresponding to the user's left and right eyes, respectively. The frame may support the at least one display 350. For example, the frame may support the first display 350-1 and the second display 350-2 to be placed at the positions corresponding to the left and right eyes of the user.

According to an embodiment, referring to FIG. 3A, when the user wears the wearable device 300, the frame may include an area 320 at least partially in contact with a part of the user's body. For example, the area 320 in contact with a part of the user's body of the frame may include a part of the user's nose, a part of the user's ear, and a part of a side surface of the user's face, which are in contact with the wearable device 300. According to an embodiment, the frame may include a nose pad 310 that contacts a part of the user's body. When the wearable device 300 is worn by the user, the nose pad 310 may be in contact with a part of the user's nose. The frame may include a first temple 304 and a second temple 305 that are in contact with another part of the user's body, which is distinguished from the part of the user's body. In one or more examples, the frame may be positioned on the user's forehead where the first and second display are projected downwards to the user's eyes without contacting the user's nose.

According to an embodiment, the frame includes a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of an edge of the first rim 301 from one end of the bridge 303, a second pad 312 disposed along a portion of an edge of the second rim 302 from the other end of the bridge 303, a first temple 304 extending from the first rim 301 to be fixed to a part of the wearer's ear, and a second temple 305 extending from the second rim 302 to be fixed to a part of the wearer's another ear. The first pad 311 and the second pad 312 may be in contact with a part of the wearer's nose, and the first temple 304 and the second temple 305 may be in contact with a part of the wearer's face and a part of the wearer's ear. The temples 304 and 305 may be rotatably connected to the rim through the hinges 306 and 307 of FIG. 3B. The first temple 304 may be rotatably connected to the first rim 301 through a first hinge 306 disposed between the first rim 301 and the first temple 304. The second temple 305 may be rotatably connected to the second rim 302 through the second hinge 307 disposed between the second rim 302 and the second temple 305. According to an embodiment, the wearable device 300 may use a touch sensor, a grip sensor, and/or a proximity sensor formed on at least a portion of a surface of the frame to identify an external object (e.g., a fingertip of a user) touching the frame and/or a gesture performed by the external object.

According to an embodiment, the wearable device 300 may include hardware elements (e.g., the hardware described above based on a block diagram of FIG. 6) performing various functions. For example, the hardware elements may include a battery module 370, an antenna module 375, optical devices 382 and 384, speakers 392-1 and 392-2, microphones 394-1, 394-2 and 394-3, a light emitting module, and/or a printed circuit board 390. Various hardware elements may be disposed within the frame.

According to an embodiment, the microphones 394-1, 394-2, and 394-3 of the wearable device 300 may be disposed on at least a portion of the frame to obtain a sound signal. Although the first microphone 394-1 disposed on the nose pad 310, the second microphone 394-2 disposed on the second rim 302, and the third microphone 394-3 disposed on the first rim 301 are illustrated in FIG. 3B, the number and arrangement of the microphones 394 are not limited to those of the embodiment of FIG. 3B. When the number of microphones 394 included in the wearable device 300 is two or more, the wearable device 300 may identify a direction of the sound signal, using a plurality of microphones arranged on different portions of the frame.

According to an embodiment, the optical devices 382 and 384 may transmit the virtual object transmitted from the at least one display 350, to the waveguides 333 and 334. For example, the optical devices 382 and 384 may include projectors. The optical devices 382 and 384 may be disposed adjacent to the at least one display 350 or may be incorporated into the at least one display 350 as a part of the at least one display 350. The first optical device 382 may correspond to the first display 350-1, and the second optical device 384 may correspond to the second display 350-2. The first optical device 382 may transmit light output from the first display 350-1 to the first waveguide 333, and the second optical device 384 may transmit light output from the second display 350-2 to the second waveguide 334.

According to an embodiment, the cameras 340 may include an eye tracking camera (ET CAM) 340-1, a motion recognition camera 340-2, and/or a photographing camera 340-3. The photographing camera 340-3, the eye tracking camera 340-1, and the motion recognition camera 340-2 may be arranged at different positions on the frame and may perform different functions. The eye tracking camera 340-1 may output data indicating a gaze of a user wearing the wearable device 300. For example, the wearable device 300 may detect the gaze from an image including the user's pupil, which may be obtained through the eye tracking camera 340-1. An example of the eye tracking camera 340-1 being disposed toward the user's right eye is illustrated in FIG. 3B. As understood by one of ordinary skill in the art, the disclosure is not limited to these configurations, and the eye tracking camera 340-1 may be disposed alone toward the user's left eye or may be disposed toward both the eyes.

According to an embodiment, the photographing camera 340-3 may capture an actual image or background to be combined with a virtual image for implementing augmented reality or mixed reality content. The photographing camera may capture an image of a specific object existing at a position viewed by the user and provide the image to the at least one display 350. The at least one display 350 may display one image in which the actual image or background including an image of the specific object obtained using the photographing camera is overlapped with the virtual image provided through the optical devices 382 and 384. According to an embodiment, the photographing camera may be disposed on the bridge 303 disposed between the first rim 301 and the second rim 302.

According to an embodiment, the eye tracking camera 340-1 may track the gaze of the user wearing the wearable device 300 so as to match the gaze of the user with visual information provided on the at least one display 350, thereby enabling implementing more realistic augmented reality. For example, when the user faces the front, the wearable device 300 may naturally display, on the at least one display 350, environment information related to the front of the user at a place where the user is located. The eye tracking camera 340-1 may be configured to capture an image of the user's pupil to determine the gaze of the user. For example, the eye tracking camera 340-1 may receive eye detection light reflected from the user's pupil and track the eye of the user based on the position and movement of the received eye detection light. According to an embodiment, the eye tracking camera 340-1 may be disposed at the positions corresponding to the left eye and the right eye of the user. For example, the eye tracking camera 340-1 may be disposed in the first rim 301 and/or the second rim 302 to face a direction in which a user wearing the wearable device 300 is located.

According to an embodiment, the motion recognition camera 340-2 may provide a specific event to a screen provided on the at least one display 350 by recognizing movement of the entire or certain part of the user's body, such as the user's torso, hand, or face. The motion recognition camera 340-2 may obtain a signal corresponding to a motion of the user by gesture recognition of the motion, and may provide an indication corresponding to the signal to the at least one display 350. A processor may identify the signal corresponding to the motion and perform a preset function based on the identification. According to an embodiment, the motion recognition camera 340-2 may be disposed on the first rim 301 and/or the second rim 302.

According to an embodiment, the cameras 340 included in the wearable device 300 are not limited to the eye tracking camera 340-1 and the motion recognition camera 340-2 described above. For example, the wearable device 300 may identify an external object included in the FoV by using the photographing camera 340-3 disposed toward the field of view (FoV) of the user. The wearable device 300 may identify the external object based on a sensor for identifying a distance between the wearable device 300 and the external object, such as a depth sensor and/or a time of flight (ToF) sensor. The camera 340 disposed toward the FoV may support an autofocus function and/or an Optical Image Stabilization (OIS) function. For example, the wearable device 300 may include the camera 340 (e.g., a face tracking (FT) camera) disposed toward the face to obtain an image including a face of the user wearing the wearable device 300.

According to an embodiment, the wearable device 300 may further include a light source (e.g., an LED) that emits light toward a subject (e.g., the user's eyes, face, and/or an external object in the FoV) captured using the camera 340. The light source may include an LED of infrared wavelength. The light source may be disposed in at least one of the frame or the hinges 306 and 307.

According to an embodiment, the battery module 370 may supply power to electronic components of the wearable device 300. According to an embodiment, the battery module 370 may be disposed in the first temple 304 and/or the second temple 305. For example, the battery module 370 may include a plurality of battery modules 370. The plurality of battery modules 370 may be disposed in the first temple 304 and the second temple 305, respectively. According to an embodiment, the battery module 370 may be disposed at one end of the first temple 304 and/or the second temple 305.

According to an embodiment, the antenna module 375 may transmit a signal or power to the outside of the wearable device 300, or may receive a signal or power from the outside. The antenna module 375 may be electrically and/or operatively connected to a communication circuitry (e.g., a communication circuitry 650 described below with reference to FIG. 6) in the wearable device 300. According to an embodiment, the antenna module 375 may be disposed in the first temple 304 and/or the second temple 305. For example, the antenna module 375 may be disposed close to one surface of the first temple 304 and/or the second temple 305.

According to an embodiment, the speakers 392-1 and 392-2 may output sound signals to the outside of the wearable device 300. A sound output module may be referred to as a speaker. According to an embodiment, the speakers 392-1 and 392-2 may be disposed in the first temple 304 and/or the second temple 305 so as to be disposed adjacent to the ears of the user wearing the wearable device 300. For example, the wearable device 300 may include a second speaker 392-2 disposed in the first temple 304 to be adjacent to the left ear of the user, and a first speaker 392-1 disposed in the second temple 305 to be adjacent to the right ear of the user.

According to an embodiment, a light emitting module may include at least one light emitting element. In order to visually provide information on a specific state of the wearable device 300 to the user, the light emitting module may emit light of a color corresponding to the specific state or emit light with a motion corresponding to the specific state. For example, when charging is required, the wearable device 300 may repeatedly emit red light at a preset time point. According to an embodiment, the light emitting module may be disposed on the first rim 301 and/or the second rim 302.

Referring to FIG. 3B, according to an embodiment, the wearable device 300 may include a printed circuit board (PCB) 390. The PCB 390 may be included in at least one of the first temple 304 or the second temple 305. The PCB 390 may include an interposer disposed between at least two sub PCBs. On the PCB 390 may be disposed one or more hardware elements (e.g., hardware elements illustrated by a block diagram to be described later with reference to FIG. 6) included in the wearable device 300. The wearable device 300 may include a flexible PCB (FPCB) for interconnecting the hardware elements.

According to an embodiment, the wearable device 300 may include at least one of a gyro sensor, a gravity sensor, and/or an acceleration sensor for detecting a posture of the wearable device 300 and/or a posture of a certain body part (e.g., a head) of a user wearing the wearable device 300. Each of the gravity sensor and the acceleration sensor may measure the acceleration of gravity and/or an acceleration, based on designated three-dimensional axes (e.g., x-axis, y-axis, and z-axis) perpendicular to each other. The gyro sensor may measure the angular velocity in each of the designated three-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify a user's motion and/or gesture performed to execute or cease a certain function of the wearable device 300, based on the IMU.

Figure 4A:
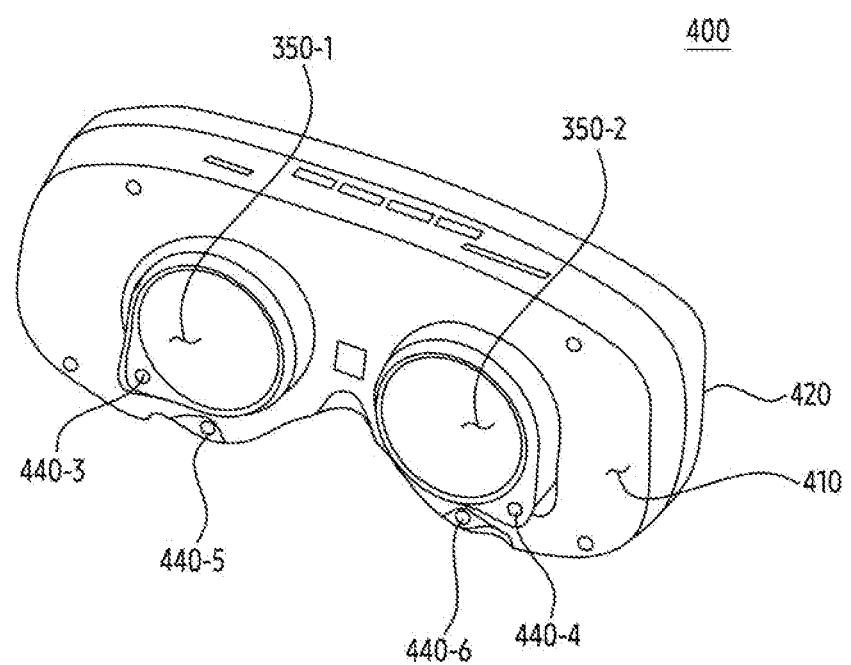
FIGS. 4A and 4B show an external appearance of an example wearable device according to one or more embodiments.
Figure 4B:
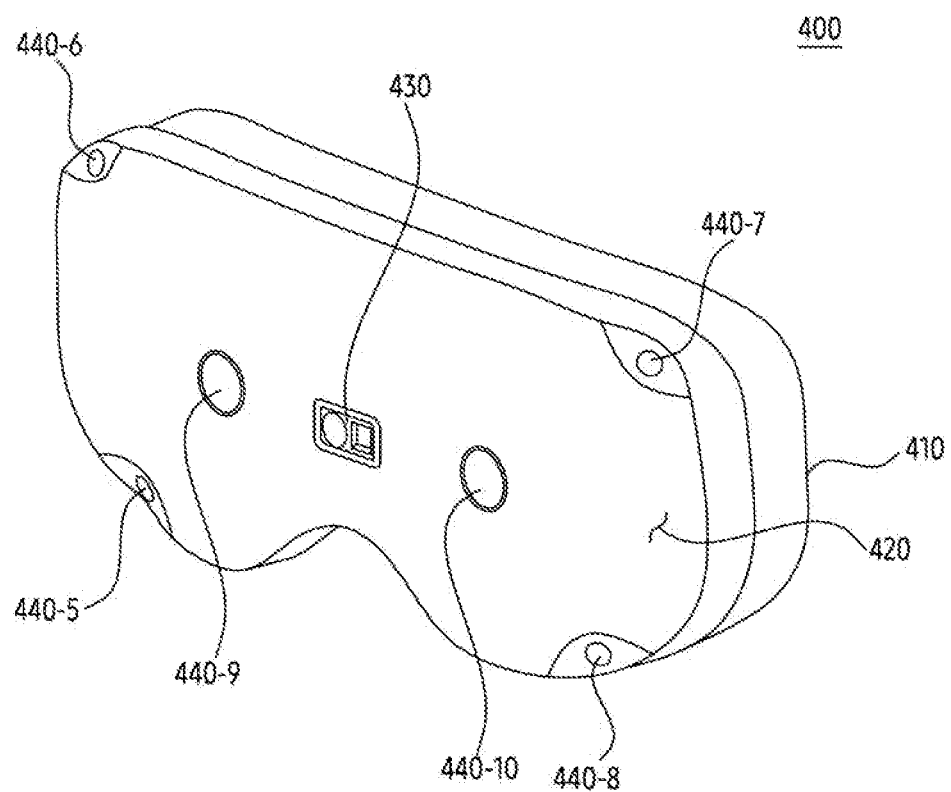

FIGS. 4A and 4B illustrate an example of the external appearance of the wearable device 400 according to an embodiment. The wearable device 400 of FIGS. 4A to 4B may include the first terminal 120-1 illustrated in FIGS. 1 and 2. According to an embodiment, an example of the external appearance of a first surface 410 of the housing of the wearable device 400 is illustrated in FIG. 4A, and an example of the external appearance of a second surface 420 opposite to the first surface 410 is illustrated in FIG. 4B.

Referring to FIG. 4A, according to an embodiment, the first surface 410 of the wearable device 400 may have a shape that is attachable onto the user's body part (e.g., the user's face). In one or more examples, the wearable device 400 may further include a strap for fixing it onto the user's body part and/or one or more temples (e.g., the first temple 304 and/or the second temple 305 of FIGS. 3A and 3B). On the first surface 410A may be disposed a first display 350-1 for outputting an image to the left eye of both the eyes of the user and a second display 350-2 for outputting an image to the right eye of both the eyes of the user. The wearable device 400 may further include rubber or silicon packing that is formed on the first surface 410 for preventing interference caused by light (e.g., ambient light) different from the light emitted from the first display 350-1 and the second display 350-2.

According to an embodiment, the wearable device 400 may include cameras 440-1 and 440-2 for photographing and/or tracking both eyes of the user adjacent to each of the first display 350-1 and the second display 350-2. The cameras 440-1 and 440-2 may be referred to as an ET camera. According to an embodiment, the wearable device 400 may include cameras 440-3 and 440-4 for photographing and/or recognizing the user's face. The cameras 440-3 and 440-4 may be referred to as an FT camera.

Referring to FIG. 4B, on the second surface 420 opposite to the first surface 410 of FIG. 4A may be disposed a camera (e.g., the cameras 440-5, 440-6, 440-7, 440-8, 440-9, 440-10) and/or a sensor (e.g., the depth sensor 430) for obtaining information related to the external environment of the wearable device 400. For example, the cameras 440-5, 440-6, 440-7, 440-8, 440-9, and 440-10 may be disposed on the second surface 420 to recognize an external object different from the wearable device 400. For example, using the cameras 440-9 and 440-10, the wearable device 400 may obtain an image and/or media to be transmitted to each of both eyes of the user. The camera 440-9 may be disposed on the second surface 420 of the wearable device 400 to obtain an image to be displayed through the second display 350-2, corresponding to the right eye of the both eyes. The camera 440-10 may be disposed on the second surface 420 of the wearable device 400 to obtain an image to be displayed through the first display 350-1, corresponding to the left eye of the both eyes.

According to an embodiment, the wearable device 400 may include a depth sensor 430 disposed on the second surface 420 to identify a distance between the wearable device 400 and an external object. Using the depth sensor 430, the wearable device 400 may obtain spatial information (e.g., depth map) about at least a portion of the FoV of the user wearing the wearable device 400.

In one or more examples, on the second surface 420 of the wearable device 400 may be disposed a microphone for obtaining a sound output from an external object. The number of microphones may be one or more according to an embodiment.

As described above, according to an embodiment, the wearable device 400 may have a form factor suitable for being worn on the user's head. The wearable device 400 may provide a user experience based on augmented reality, virtual reality, and/or mixed reality in the state of being worn on the head. Using the cameras 440-5, 440-6, 440-7, 440-8, 440-9, and 440-10 for acquiring media for the external space, the wearable device 400 and a server (e.g., the server 110 of FIG. 1) connected to the wearable device 400 may provide an on-demand service and/or a metaverse service for providing media of a location and/or a place selected by the user.

Hereinafter, with reference to an embodiment of FIG. 5, detailed description will be made of an example of operation in which the wearable device (e.g., the first terminal 120-1 of FIGS. 1 and 2) including the wearable device 300 of FIGS. 3A and 3B and/or the wearable device 400 of FIGS. 4A and 4B records media for a specific location and/or a specific place.

Figure 5:
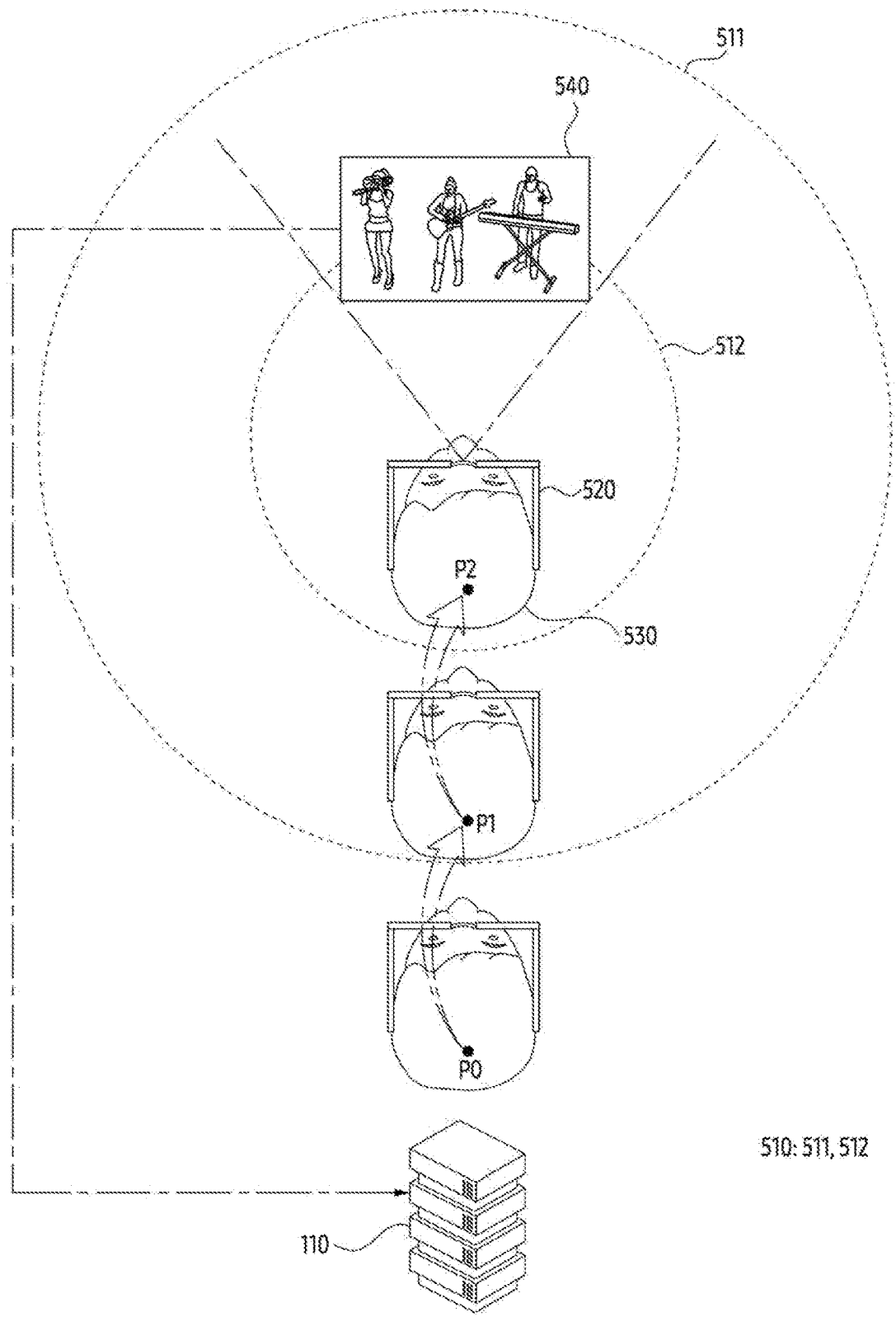
FIG. 5 illustrates an example of operation of controlling, by a wearable device, a camera based on a location of the wearable device, according to one or more embodiments.

FIG. 5 illustrates an example of operation, performed by the wearable device 520, of controlling a camera based on a location of the wearable device 520, according to an embodiment. The wearable device 520 of FIG. 5 may include the first terminal 120-1 of FIGS. 1 and 2, the wearable device 300 of FIGS. 3A and 3B, and/or the wearable device 400 of FIGS. 4A and 4B. For example, the wearable device 520 may include a head-mounted display (HMD) that is wearable on the head of the user 530.

According to an embodiment, the wearable device 520 may include a camera (e.g., the photographing camera 340-3 of FIG. 3B and/or the cameras 440-9 and 440-10 of FIG. 4B) disposed toward the front of the user 530, in which the wearable device is in the state of being worn by the user 530. The front of the user 530 may include a direction in which the head of the user 530 and/or two eyes included in the head face. In order to provide a user interface (UI) based on AR, VR, and/or MR to the user 530 wearing the wearable device 520, the wearable device 520 may control the camera. The UI may be related to the metaverse service provided by the wearable device 520 and/or the server 110 connected to the wearable device 520.

According to an embodiment, the server 110 may receive media obtained at different times and/or at different locations from a plurality of electronic devices (e.g., the user terminal 120 of FIGS. 1 and 2) including the wearable device 520. The media may include a video, an image such as photos, an audio, or a combination thereof. The media may be overlaid on real world objects. The server 110 may provide a video on demand (VOD) service for a specific location and/or a specific event, based on the received media. The VOD service may be included in the metaverse service provided by the server 110. The server 110 of FIG. 6 may include the server 110 of FIG. 1. The wearable device 520 and one or more hardware elements included in the server 110 will be described in more detail with reference to FIG. 6.

According to an embodiment, the wearable device 520 may conditionally initiate acquisition and/or recording of media to be transmitted to the server 110, based on the location of the wearable device 520. For example, the wearable device 520 may identify whether to initiate recording of media, by comparing the location of the wearable device 520 with an area 510 geographically specified by the server 110 or the metaverse service provided by the server 110. The wearable device 520 may include a sensor (e.g., a global positioning system (GPS) sensor) for monitoring the location of the wearable device 520. The wearable device 520 may receive information for identifying the area 510 from the server 110. Based on the information received from the server 110 and the data of the sensor, the wearable device 520 may make adjustment of the state of the camera and/or perform recording of media.

Referring to FIG. 5, an example of the area 510 compared to the location of the wearable device 520 is illustrated. The area 510 may be set by the server 110 connected by the wearable device 520. An example of an operation by the server 110 receiving an input indicating setting of the area 510 from a subscriber (e.g., the user 530) of the service provided by the server 110 will be described with reference to FIG. 7. Referring to FIG. 5, the area 510 having a circular shape is illustrated, but the disclosed embodiment is not limited thereto. The server 110 may transmit information for identifying the area 510 to the wearable device 520. The information may include coordinates indicating a center point of the area 510 and/or one or more coordinates indicating one or more points on a boundary line. The coordinates included in the information may include numerical values indicating latitude and/or longitude of a certain point corresponding to the coordinates.

According to an embodiment, the server 110 may subdivide the area 510 formed to adjust media recording by the wearable device 520 into a first area 511 and a second area 512, depending on which one of different functions of controlling the camera is performed. For example, the first area 511 and the second are 512 may be concentric circles in which the first area 511 may include the second area 512. The first area 511 may be an area enlarged by a specified distance from a boundary line of the second area 512, as a margin of the second area 512. The shape of the first area 511 including the second area 512 may be dependent on the shape of the second area 512 or may have a shape different from the shape of the second area 512. The centers of each of the first area 511 and the second area 512 included in the area 510 may coincide with each other. However, the disclosure is not limited to the embodiment and the center of the first area 511 may be separated from that of the second area 512. The first area 511 may be set by the server 110 to execute a function for adjusting to a preset state capable of recording media by using the camera of the wearable device 520. The second area 512 may be set by the server 110 to execute a function for recording media by using the camera of the wearable device 520. According to an embodiment, the wearable device 520 may selectively execute at least one of the functions related to media recording, by comparing the area 510 and the location of the wearable device 520 identified by the data of the sensor.

Referring to FIG. 5, it is illustrated an exemplary case in which the user 530 sequentially moves to a position P0, a position P1, and a position P2. In one or more examples, the position P0 may correspond to a position spaced apart from the area 510 set by the server 110, for example, the position outside the first area 511. Further, in one or more examples, the position P1 may be located in the area 510 and is a position inside the first area 511 amongst the first area 511 and the second area 512. Further, in one or more examples, the position P2 may be located in the area 510 and is a position inside the second area 512. While the user 530 wearing the wearable device 520 may sequentially move to the position P0, the position P1, and the position P2, the wearable device 520 may identify a change in location of the wearable device 520 using a sensor.

According to an embodiment, when the user is located at the position P0, the wearable device 520 may identify the location of the wearable device 520 using the sensor. When it is identified or determined the position P0 is disposed outside the first area 511, the wearable device 520 may operate independently of a function (or application) for recording of media for the area 510 including the first area 511 and the second area 512 and uploading the media to the server 110. For example, the wearable device 520 may execute one or more applications installed in the wearable device 520 based on an interaction between the user 530 and the wearable device 520.

According to an embodiment, in case where the user moves from the position P0 to the position P1 inside the first area 511 across the boundary line of the first area 511, the wearable device 520 may identify that the location of the wearable device 520 moves to the position P1 inside the first area 511 by using the sensor. When it is identified or determined that the position P1 is included in the first area 511 by comparing the position P1 of the wearable device 520 with the first area 511, the wearable device 520 may execute a function mapped to the first area 511. For example, the wearable device 520 may change the state of the camera of the wearable device 520 to a preset state for recording media. The preset state may include a state of causing the camera of the wearable device 520 to be matched with a specific application from a plurality of different applications executed by the wearable device for recording media to be uploaded to the server 110. The preset state may include a state in which the camera is activated based on execution of the specific application. Hereinafter, referring to FIG. 8, description will be made of an example of a UI displayed through the wearable device 520 based on execution of the specific application.

According to an embodiment, when it is determined the user moves from the position P1 across the boundary line of the second area 512 to the position P2 inside the second area 512, the wearable device 520 may identify that the location of the wearable device 520 moves to the position P2 inside the second area 512 by using the sensor. When it is identified or determined that the position P2 of the wearable device 520 is included in the second area 512, the wearable device 520 may identify or determine a function mapped to the second area 512. The function mapped to the second area 512 may include a function of controlling the camera of the wearable device 520 to record the media 540. For example, the wearable device 520 may record the media 540 by controlling the camera activated by the function mapped to the first area 511 larger than the second area 512. Recording the media 540 by the wearable device 520 may be performed conditionally based on whether the location of the wearable device 520 is included in the second area 512. For example, when it is determined the location of the wearable device 520 is changed to a position outside of the second area 512 after the recording of the media 540 is initiated, the wearable device 520 may cease recording the media 540. Because the state of the camera is adjusted by using the first area 511 greater than the second area 512 for recording the media 540, the wearable device 520 can initiate recording of the media 540 more quickly based on whether the wearable device 520 enters into the second area 512.

According to an embodiment, the wearable device 520 may transmit (e.g., upload) the media 540 recorded in the second area 512 to the server 110. An example of an operation of the wearable device 520 transmitting the media 540 will be described with reference to FIG. 8. The server 110 may store the media 540 received from the wearable device 520. The server 110 may include a database for managing media received from a plurality of external electronic devices including the wearable device 520. Based on the database, the server 110 may classify the media 540, based on at least one of a location (e.g., the second area 512) where the media 540 is recorded, a time point at which the media 540 is recorded, or an event (or scene) captured by the media 540. According to an embodiment, the server 110 receiving and/or storing the media 540 may synthesize at least one media from one or more media included in the database. For example, the server 110 may synthesize the media 540 with other media captured in the second area 512 during another time interval at least partially overlapping the time interval in which the media 540 is captured. Based on the server 110 synthesizing the media 540 with the other media, the server 110 may obtain the media 540 and another media having a field-of-view (FOV) different from the other media. An example of an operation of the server 110 synthesizing different media will be described with reference to FIG. 9.

According to an embodiment, the server 110 may provide, to the wearable device 520, a search service based on a database for managing media collected by the server 110. For example, the server 110 may transmit a list of at least one of the plurality of media stored in the server 110 to the wearable device 520 based on text (e.g., query) received from the wearable device 520. For example, in response to an input indicating that a list of the at least one media captured in the second area 512 is required, the wearable device 520 may transmit a signal related to the input to the server 110. As a response to the signal, the server 110 may transmit, to the wearable device 520, a list indicating the at least one media captured in the second area 512. An example of a UI displayed by the wearable device 520 to search for the media stored in the server 110 will be described with reference to FIGS. 10 and 11.

As described above, according to an embodiment, the wearable device 520 may obtain the media 540 based on whether the wearable device 520 enters the geographically specified area 510. By using the first area 511 and the second area 512 formed concentrically in the area 510, the wearable device 520 may sequentially perform operations for recording the media 540. The server 110 may receive the media 540 obtained in the area 510 from the wearable device 520 and store the same. The server 110 may collect a plurality of media related to the area 510 from a plurality of electronic devices including the wearable device 520. Based on the collected plurality of media, the server 110 may provide a user experience substantially similar to controlling a virtual camera installed in the area 510 to the user 530, using the wearable device 520. Accordingly, as illustrated in FIG. 5, the wearable device 520 may perform different actions based on a location of the wearable device 520 in a specific area.

Although the embodiment based on the wearable device 520 has been heretofore described as an example of an electronic device including a camera for recording media in the area 510, the disclosure is not limited to the embodiment. For example, the electronic device for recording the media based on whether the electronic device enters the area 510 may encompass not only the wearable device 520 described with reference to FIG. 5 and the drawings to be further described below, but also a smartphone, a tablet personal computer (PC), a smart accessory including a smart watch, an unmanned aerial vehicle (UAV), and/or a vehicle (e.g., an autonomous vehicle).

Hereinafter, with reference to FIG. 6, description will be made of an example of one or more hardware elements included in the wearable device 520 and the server 110, and an application executed by each of the wearable device 520 and the server 110, according to an embodiment.

Figure 6:
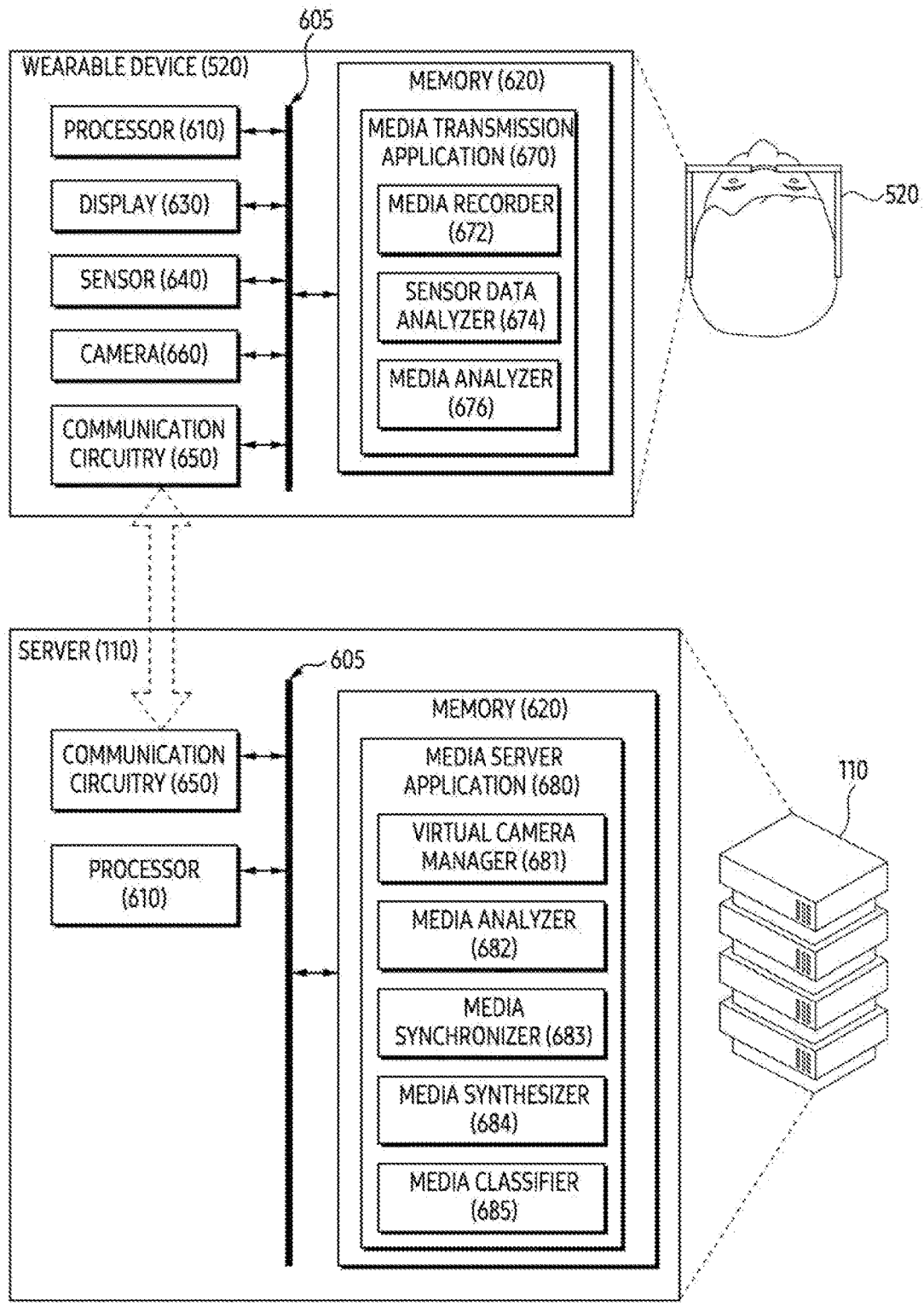
FIG. 6 is a block diagram of a wearable device and a server connected to the wearable device according to one or more embodiments.

FIG. 6 is a block diagram of the wearable device 520 and the server 110 connected to the wearable device 520 according to an embodiment. The wearable device 520 and the server 110 of FIG. 6 may include the wearable device 520 and the server 110 of FIG. 5. Referring to FIG. 6, the wearable device 520 and the server 110 may be connected to each other based on a wired network and/or a wireless network. The wired network may include a network such as Internet, a local area network (LAN), a wide area network (WAN), Ethernet, or a combination thereof. The wireless network may include a network such as Long Term Evolution (LTE), 5G New Radio (NR), Wireless Fidelity (Wi-Fi), Zigbee, Near Field Communication (NFC), Bluetooth, Bluetooth low-energy (BLE), or a combination thereof. Although the wearable device 520 and the server 110 are illustrated to be directly connected to each other, the wearable device 520 and the server 110 may be indirectly connected via an intermediate node (e.g., one or more routers and/or Access Points (APs)) in a network.

According to an embodiment, the wearable device 520 may include at least one of a processor 610, a memory 620, a display 630, a sensor 640, a communication circuitry 650, or a camera 660. The processor 610, the memory 620, the display 630, the sensor 640, the communication circuitry 650, and the camera 660 may be electrically and/or operably coupled with each other via an electronic component such as a communication bus 605. Hereinafter, the hardware elements being operatively coupled with each other may imply that either a direct connection or an indirect connection between those hardware elements is established by a wired or wireless manner such that a second hardware element may be controlled by a first hardware element among the hardware elements. Although the above embodiment is illustrated based on different blocks, the disclosure is not limited thereto, and some of the hardware elements of FIG. 6 (e.g., at least a portion of the processor 610, the memory 620, and the communication circuitry 650) may be incorporated into a single integrated circuit such as a system-on-chip (SoC). The type and/or the number of hardware elements included in the wearable device 520 is not limited to that illustrated in FIG. 6. For example, the wearable device 520 may include only some of the hardware elements illustrated in FIG. 6.

According to an embodiment, the processor 610 of the wearable device 520 may include a hardware element for processing data based on one or more instructions. The hardware element for processing data may include, for example, an arithmetic and logic unit (ALU), a floating point unit (FPU), a field programmable gate array (FPGA), a central processing unit (CPU), and/or an application processor (AP). The processor 610 may have a structure of a single-core processor, or may have a structure of a multi-core processor such as e.g., a dual-core, a quad-core, or a hexa-core.

According to an embodiment, the memory 620 of the wearable device 520 may include a hardware element for storing data and/or instructions input and/or output to/from the processor 610 of the wearable device 520. The memory 620 may include, for example, a volatile memory such as a random-access memory (RAM) and/or a non-volatile memory such as a read-only memory (ROM). The volatile memory may include, for example, at least one of a dynamic RAM (DRAM), a static RAM (SRAM), a cache RAM, or a pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, a solid state drive (SSD), and an embedded multi-media card (eMMC).

According to an embodiment, the display 630 of the wearable device 520 may output visualized information (e.g., a visual object and/or a screen illustrated in FIGS. 7 to 11) to the user 520. For example, the display 630 may be controlled by the processor 610 including a processing circuit such as a graphic processing unit (GPU) to output the visualized information to the user. The display 630 may include a flat panel display (FPD) and/or an electronic paper. The FPD may include a liquid crystal display (LCD), a plasma display panel (PDP), and/or one or more light emitting diodes (LEDs). The LED may include an organic LED (OLED). The display 630 of FIG. 6 may include at least one display 350 illustrated in FIGS. 3A and 3B and/or FIGS. 4A and 4B.

According to an embodiment, the sensor 640 of the wearable device 520 may generate electrical information that may be processed by the processor 610 and/or the memory 620 of the wearable device 520 from non-electronic information related to the wearable device 520. For example, the sensor 640 may include a global positioning system (GPS) sensor for detecting a geographic location of the wearable device 520. In addition to such a GPS scheme, the sensor 640 may generate information indicating the geographical location of the wearable device 520, for example, based on a global navigation satellite system (GNSS) such as Galileo, Beidou, Compass or any other navigation satellite system known to one of ordinary skill in the art. The information may be stored in the memory 620, processed by the processor 610, and/or transmitted to another electronic device (e.g., the server 110) different from the wearable device 520 via the communication circuitry 650. The sensor 640 is not limited to those described above, and may include an image sensor for detecting electromagnetic waves including light, an illuminance sensor, a time-of-flight (ToF) sensor, and/or an inertial measurement unit (IMU) for detecting a physical motion of the wearable device 520.

According to an embodiment, the communication circuitry 650 of the wearable device 520 may include a hardware component for supporting transmission and/or reception of electrical signals in between the wearable device 520 and the server 110. Although the server 110 is only illustrated as an electronic device connected to the wearable device 520 via the communication circuitry 650, the disclosure is not limited to these configurations. The communication circuitry 650 may include, for example, at least one of a modem, an antenna, or an optic-to-electronic (O/E) converter. The communication circuitry 650 may support transmission and/or reception of electrical signals, based on various types of communication protocols such as e.g., Ethernet, Local Area Network (LAN), Wide Area Network (WAN), Wireless Fidelity (Wi-Fi), Bluetooth, Bluetooth Low Energy (BLE), ZigBee, Long Term Evolution (LTE), 5G New Radio (NR) or any other communication protocol known to one of ordinary skill in the art.

According to an embodiment, the camera 660 of the wearable device 520 may include at least one optical sensor (e.g., a charged coupled device (CCD) sensor or a complementary metal oxide semiconductor (CMOS) sensor) that generates an electrical signal indicating color and/or brightness of light. A plurality of optical sensors included in the camera 660 may be disposed in the form of a two-dimensional array. The camera 660 may obtain electrical signals of each of the plurality of optical sensors substantially at the same time to generate two-dimensional frame data corresponding to light reaching the optical sensors of the two-dimensional array. For example, the photo data captured using the camera 660 may mean one set of two-dimensional frame data obtained from the camera 660. For example, the video data captured using the camera 660 may refer to a sequence of a plurality of two-dimensional frame data, obtained from the camera 660 according to a frame rate. The camera 660 may be disposed toward a direction in which the camera 660 receives the light, and may further include a flashlight for emitting light toward the direction. Although the camera 660 is illustrated as a single block, the number of cameras 660 included in the wearable device 520 is not limited to the embodiment illustrated above. As in one or more cameras 340 of FIGS. 3A and 3B and/or FIGS. 4A and 4B, the wearable device 520 may include one or more cameras.

In one or more examples, according to an embodiment, the wearable device 520 may include an output means for outputting information in another form other than the visualized form. For example, the wearable device 520 may include at least one speaker (e.g., the speakers 392-1 and 392-2 of FIGS. 3A and 3B) for outputting an acoustic signal. For example, the wearable device 520 may include a motor for providing haptic feedback based on vibration.

In an embodiment of FIG. 6, the server 110 may include at least one of a processor 610, a memory 620, or a communication circuitry 650. In the server 110, the processor 610, the memory 620, and the communication circuitry 650 may be electrically and/or operatively coupled to each other via the communication bus 605. The processor 610, the memory 620, and the communication circuitry 650 included in the server 110 may include hardware elements and/or circuits corresponding to the processor 610, the memory 620, and the communication circuitry 650 of the wearable device 520. Hereinafter, for conciseness of description, the descriptions of the processor 610, the memory 620, and the communication circuitry 650 included in the server 110 may be omitted so as not to overlap those of the processor 610, the memory 620, and the communication circuitry 650 included in the wearable device 520.

According to an embodiment, in the memory 620 of the wearable device 520 may be stored one or more instructions (or commands) indicating a certain operation and/or calculation on data to be performed by the processor 610 of the wearable device 520. The set of one or more instructions may be referred to as firmware, operating system, process, routine, sub-routine, and/or application. In the memory 620 of the server 110 may be stored one or more instructions indicating an operation and/or calculation on data to be performed by the processor 610 of the server 110. Referring to FIG. 6, the processor 610 of the wearable device 520 may execute a media transmission application 670 in the memory 620 to perform at least one of the operations of FIG. 12. The processor 610 of the server 110 may execute a media server application 680 in the memory 620 to perform at least one of the operations of FIGS. 13 and 14. Hereinafter, an application being installed in an electronic device (e.g., the wearable device 520 and/or the server 110) may mean that one or more instructions provided in the form of an application are stored in the memory of the electronic device, and thus the one or more applications are stored in the format executable by a processor of the electronic device (e.g., a file having an extension designated by an operating system of the electronic device).

Referring to FIG. 6, one or more instructions included in the media transmission application 670 may be classified into a media recorder 672, a sensor data analyzer 674, and/or a media analyzer 676. The media transmission application 670 may be provided by another server (e.g., a third-party application store) connected to the wearable device 520 via the communication circuitry 650 and distinguished from the server 110. While the media transmission application 670 is being executed, the processor 610 of the wearable device 520, based on the location of the wearable device 520 identified by the sensor 640, may perform an operation to control the camera 660 independently of the input of the user 530 to obtain media for the location, or transmit the obtained media to the server 110.

According to an embodiment, the processor 610 of the wearable device 520 may identify the location of the wearable device 520 from the data of the sensor 640, based on execution of the media recorder 672 in the media transmission application 670. Based on the location, the processor 610 of the wearable device 520 may determine a time point at which recording of the media is started and/or a time point at which recording of the media is ceased. Based on at least one of these time points, the processor 610 of the wearable device 520 may control the camera 660. For example, based on execution of the media recorder 672, the wearable device 520 may obtain the media 540 of FIG. 5.

According to an embodiment, while acquiring media based on the execution of the media recorder 672, the processor 610 of the wearable device 520 may obtain data related to the media and/or the camera 660 from the sensor 640 including the GPS sensor. The data obtained from the sensor 640 may be processed by the processor 610 of the wearable device 520, based on execution of the sensor data analyzer 674. For example, based on the execution of the sensor data analyzer 674, the processor 610 of the wearable device 520 may identify the position and/or direction (e.g., azimuth angle) of the wearable device 520 from the data of the sensor 640.

According to an embodiment, based on the location of the wearable device 520 identified based on the execution of the sensor data analyzer 674, the processor 610 of the wearable device 520 may control the camera 660 to determine whether to cease photographing media. For example, by comparing an area (e.g., the area 510 of FIG. 5) configured for media recording with the location of the wearable device 520, the wearable device 520 may identify whether a user wearing the wearable device 520 approaches or enters an inside of the area, or moves out of the area. Based on a result of comparing the area and the location, the wearable device 520 may obtain a time point at which recording of the media starts and/or a time point at which recording of the media ends. The processor 610 of the wearable device 520 may obtain a time point at which it is identified whether to transmit the media to the server 110, based on the location of the wearable device 520 identified based on the execution of the sensor data analyzer 674.

According to an embodiment, based on the execution of the sensor data analyzer 674, the processor 610 of the wearable device 520 may obtain information identified by the data of the sensor 640 (e.g., information indicating at least one of acceleration, angular velocity, or magnetic north direction of the wearable device 520). The information may be stored together with media obtained using the camera 660, or may be stored in metadata corresponding to the media. The information may be transmitted to the server 110 together with the media. Based on the execution of the sensor data analyzer 674, the processor 610 of the wearable device 520 may synchronize the obtained information with the media obtained by the camera 660. Based on the execution of the sensor data analyzer 674, the processor 610 of the wearable device 520 may remove (e.g., crop) and/or divide at least a portion of the media obtained by the camera 660. For example, when it is identified, based on the execution of the sensor data analyzer 674, the time point at which the location of the wearable device 520 is moved out of the area set for recording the media, the processor 610 of the wearable device 520 may divide the media, based on the identified time point. When the time point is identified, the processor 610 of the wearable device 520 may remove at least a portion of the media included in a time interval after the identified time point.

According to an embodiment, the processor 610 of the wearable device 520 may generate metadata of media obtained from the camera 660, based on the execution of the sensor data analyzer 674. The sensor data analyzer 674 may be referred to as a metadata generator. Based on the execution of the sensor data analyzer 674, the processor 610 of the wearable device 520 may generate metadata including text and/or a tag obtained from the user 530. Based on the execution of the sensor data analyzer 674, the processor 610 of the wearable device 520 may identify an event and/or a subject (e.g., a person) included in the media. Information obtained by the processor 610 of the wearable device 520 based on the sensor data analyzer 674 is not limited to the above example, and a UI displayed by the processor 610 of the wearable device 520 via the display 630 based on the information is also not limited to the example. For example, based on the direction of the wearable device 520 identified based on the execution of the sensor data analyzer 674, the processor 610 of the wearable device 520 may determine whether to output a guide for changing the FoV of the camera 660.

According to an embodiment, the processor 610 of the wearable device 520 may execute the media transmission application 670 to obtain media captured by the camera 660 in a specific area. When the media analyzer 676 of the media transmission application 670 is executed, the processor 610 of the wearable device 520 may obtain and/or generate metadata used for classification of media obtained based on the media recorder 672. The metadata may be used for searching and/or classifying the media. The metadata may include at least one of the location and/or the area (e.g., the area designated by the server 110) included in the media, the FoV of the camera 660 capturing the media, and/or the azimuth angle. Although an embodiment of the media analyzer 676 being stored in the memory 620 of the wearable device 520 is illustrated herein, the present disclosure is not limited to the embodiment.

According to an embodiment, based on the execution of the media transmission application 670, the processor 610 of the wearable device 520 may transmit the media to the server 110 via the communication circuitry 650. When metadata corresponding to the media is obtained with the media analyzer 676 included in the media transmission application 670, the processor 610 of the wearable device 520 may transmit the generated metadata together with the media through the communication circuitry 650.

Referring to FIG. 6, one or more instructions included in the media server application 680 may be classified into a virtual camera manager 681, a media analyzer 682, a media synchronizer 683, a media synthesizer 684, and/or a media classifier 685. When the media server application 680 is executed, the processor 610 of the server 110 may obtain a plurality of media from a plurality of external electronic devices including the wearable device 520 via the communication circuitry 650.

According to an embodiment, the processor 610 of the server 110 may add, delete, and/or change the area (e.g., the area 510 of FIG. 5) in which a plurality of external electronic devices connected to the server 110 capture the media, based on execution of the virtual camera manager 681 in the media server application 680. The changing of the area may include changing a size and/or shape of the area. Based on the execution of the virtual camera manager 681, the server 110 may collect the media from the external electronic devices moved into the area. Using the collected media, the server 110 may provide a user experience similar to a virtual camera disposed in the area to subscribers of the server 110. The virtual camera may be related to information indicating a condition that the plurality of external electronic devices connected to the server 110 record the media based on the area and/or a condition that the media is shared. The virtual camera may be a unit for controlling transmission and/or reception of the media, based on the location where the media is recorded. Hereinafter, with reference to FIG. 7, description will be made of an exemplary operation of the server 110 generating the virtual camera based on an interaction between the external electronic device and the server 110.

For example, the information that is managed based on the execution of the virtual camera manager 681, indicating the virtual camera related to the area, may include at least one of a size of the area, a time of recording media in the area, FoV-related information (e.g., orientation and/or view angle of the camera capturing the media), an event included in the media, or an access permission to the media corresponding to the virtual camera. Based on the virtual camera manager 681, the server 110 may restrict generation of the virtual camera for a specific area or may reject a request for generating the virtual camera. The information managed by the execution of the virtual camera manager 681 may include a size of the area, a range of the area, and/or information (e.g., resolution and/or type) related to the virtual camera disposed in the area. In response to receiving the request for generating the virtual camera from the external electronic device, the server 110 may generate the virtual camera corresponding to the request based on the execution of the virtual camera manager 681. Based on the execution of the virtual camera manager 681, the server 110 may identify an area selected by the request. The server 110 may include the region, and may set another area concentric with the area as an area for preparing to record the media within the area. For example, the area selected by the request may correspond to the second area 512 of FIG. 5, and the other area may correspond to the first area 511 of FIG. 5.

According to an embodiment of the disclosure, the processor 610 of the server 110 may obtain metadata about the media received through the communication circuitry 650, based on the execution of the media analyzer 682 in the media server application 680. Such obtaining of the metadata for the media by the processor 610 of the server 110 may be performed conditionally based on whether the metadata corresponding to the media is received via the communication circuitry 650. For example, the processor 610 of the server 110 may obtain the metadata corresponding to the media, based on failure to receive the metadata corresponding to the media, from the wearable device 520 that has recorded the media, by executing the media analyzer 682. The embodiments of the disclosure are not limited to the above disclosed embodiments, and the processor 610 of the server 110 may execute the media analyzer 682 to change the metadata received from the wearable device 520 that has recorded the media or to supplement the metadata. For example, based on the execution of the media analyzer 682, the server 110 may add information not included in the metadata into the metadata generated by the wearable device 520. For example, based on the execution of the media analyzer 682, the server 110 may add information included in the metadata of a specific media to metadata of another media (e.g., other media recorded at a location and/or a time point similar to the specific media).

According to an embodiment, the metadata obtained by the server 110, based on the execution of the media analyzer 682, may include the location or time at which the media corresponding to the metadata is recorded, and/or information about the camera recording the media. The metadata may include information for identifying an event included in the media. The metadata may include information (e.g., a description of the media such as, e.g., a tag) input by a user of an external electronic device (e.g., the wearable device 520) capturing the media. The metadata obtained based on the execution of the media analyzer 682 may be used to classify and/or search for the media corresponding to the metadata.

According to an embodiment, the processor 610 of the server 110 may compensate for a time difference between the media, based on execution of the media synchronizer 683 in the media server application 680. Based on the compensation of the time difference, the server 110 may perform synchronization of the media. For example, the server 110 may compensate for a time difference between the external electronic devices that have transmitted the media. Based on the execution of the media synchronizer 683, the server 110 may predict the time at which the media was recorded, in case where the server 110 does not receive any information related to the time of the media together with the media. In one or more examples, the time differences may be compensated for by adding a lag to one or more media.

According to an embodiment, the processor 610 of the server 110 may synthesize the media, based on the execution of the media synthesizer 684 in the media server application 680. For example, as the media synchronized by the execution of the media synchronizer 683 are synthesized by the execution of the media synthesizer 684, the processor 610 of the server 110 may obtain another media having a FoV different from the FoVs of the media. For example, the processor 610 of the server 110 may generate, from a plurality of media, the another media having the FoV suitable for representing an event included in the plurality of media. For example, the server 110 identifying one subject commonly included in the plurality of media may generate other media that is different from the FoVs of the plurality of media and has other FoV including the subject. An operation by the server 110 of synthesizing other media different from the plurality of media from the plurality of media, based on the execution of the media synthesizer 684 will be described with reference to FIG. 9.

According to an embodiment, the processor 610 of the server 110 may classify the media collected from a plurality of external electronic devices connected to the server 110 through the communication circuitry 650 and/or the media synthesized by the media synthesizer 684, based on execution of the media classifier 685. For example, based on the execution of the media classifier 685, the processor 610 of the server 110 may classify the media stored in the memory 620 of the server 110. The processor 610 of the server 110 may classify the media based on the location where a virtual camera corresponding to each of the media is installed, the location where the media has been captured, the time captured, and/or the metadata.

According to an embodiment, the processor 610 of the server 110 may manage the database for searching for the media, based on the execution of the media classifier 685. The database may include a set of systematized information for searching for the media. In the set of information, different information may be combined with each other, based on units such as type, column, record, and/or table. Such a combination of information may be used for adding, deletion, updating, and/or searching of information in the database. For example, in a state of the server 110 searching for media of a specified condition, the server 110 may identify at least one media satisfying the condition, using a database. In the above example, the server 110 may search for at least one media satisfying the specified condition in the database, based on a request from an external electronic device such as the wearable device 520. Based on the execution of the media classifier 685, the server 110 may generate a database in which the plurality of media are classified based on the location and the time at which each of the plurality of media has been recorded, an event included in each of the plurality of media, and/or information (e.g., a tag) assigned to each of the plurality of media. In addition to the media received from the plurality of external electronic devices, the server 110 may store the media obtained based on the execution of the media synthesizer 684 in the memory 620 of the server 110 based on the database. The server 110 may perform a grouping of a plurality of media in the database based on generation and/or removal of the virtual camera, based on the execution of the media classifier 685. An example of an operation of the server 110 providing the external electronic device with a result of searching for the media, based on the database generated by the media classifier 685 will be described with reference to FIGS. 10 and 11.

As described above, according to an embodiment, the applications (e.g., the media transmission application 670 and the media server application 680) for collecting and/or searching for the media may be installed in the wearable device 520 and the server 110. Based on the execution of the media transmission application 670, the wearable device 520 may compare the area set by the server 110 with the location of the wearable device 520 to control recording of the media. The area set by the server 110 may include an area set to provide on-demand media based on the virtual camera. The server 110 may receive the media recorded by the plurality of external electronic devices from the plurality of external electronic devices including the wearable device 520. The server 110 may classify the media received from the plurality of external electronic devices, based on the execution of the media server application 680. Based on the result of classification of the media, the server 110 may provide a service for searching for the media.

Hereinafter, according to an embodiment, an example of operation of adding a virtual camera for classification and/or search of the media, based on an interaction between the wearable device 520 and the server 110, will be described with reference to FIG. 7.

Figure 7:
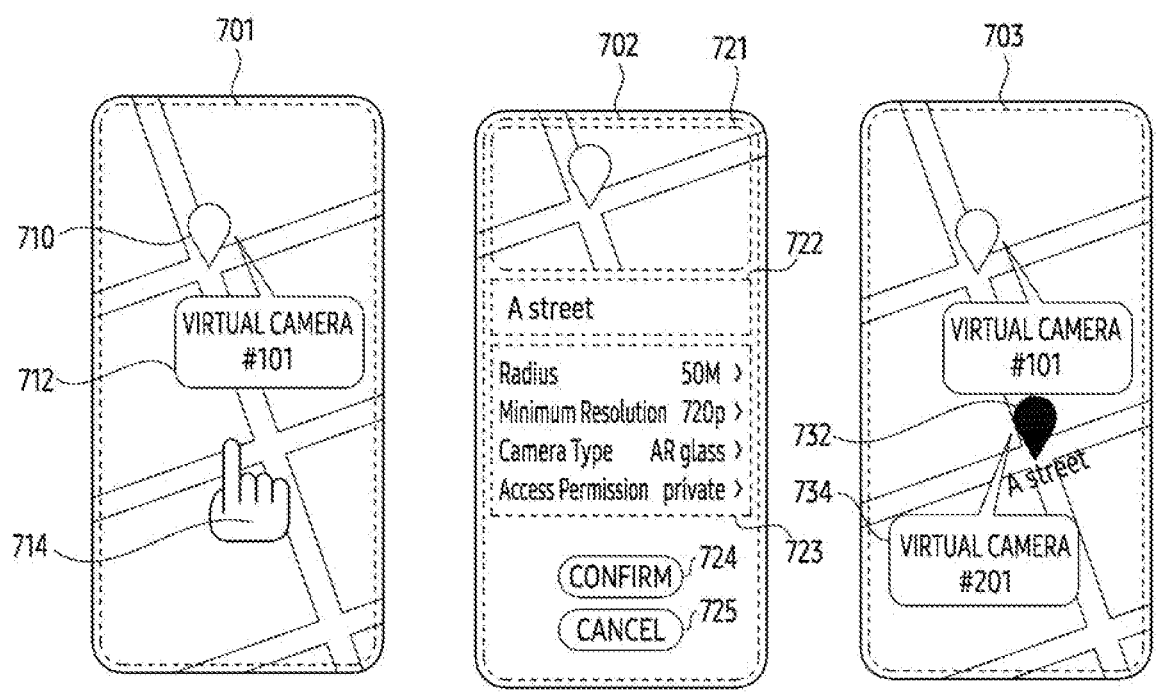
FIG. 7 illustrates an example of operation of obtaining, by a wearable device, a location used for media recording, according to one or more embodiments.

FIG. 7 illustrates an example of operation of a wearable device obtaining a location used for media recording, according to an embodiment. The wearable device of FIG. 7 may be an example of the wearable device 520 of FIGS. 5 and 6. Referring to FIG. 7, illustrated are screens 701, 702, and 703 displayed by the wearable device to add a virtual camera, based on execution of an application including the media transmission application (e.g., the media transmission application 670 of FIG. 6). The virtual camera may be used as a basis for classifying the media by the server (e.g., the server 110 of FIGS. 5 and 6) connected to the wearable device. The screens 701, 702, and 703 may be viewed with at least part of a FoV of the user through the display of the wearable device while the user (e.g., the user 530 of FIG. 5) is wearing the wearable device.

Referring to FIG. 7, the wearable device may display a screen 701 for visualizing a virtual camera based on a map. When the screen 701 being displayed, the wearable device may receive, from the server connected to the wearable device, information for visualizing one or more virtual cameras included in the map displayed through the screen 701. The wearable device may display a visual object 710 corresponding to the virtual camera included in the map, based on the information received from the server, in the map displayed through the screen 701. The visual object 710 may be superimposed on a real world object. The wearable device may display a location mapped to the virtual camera on the map using the visual object 710 having a pin shape. Along with the visual object 710, the wearable device may display a visual object 712 superimposed on the map including data related to the virtual camera. The wearable device may display text (e.g., 'virtual camera #101') including an identifier (e.g., ID) assigned to the virtual camera, in the visual object 712 having a bubble shape. In response to an input indicating that at least one of the visual objects 710 and 712 is touched (e.g., the user reaching out in the virtual space to touch or activate a visual object), the wearable device may display information related to the virtual camera corresponding to the visual objects 710 and 712. In one or more examples, the activation or selection of a visual object may be based upon a voice command.

According to an embodiment, with the screen 701 being displayed, the wearable device may identify an input 714 indicating that a virtual camera is added in the screen 701. The wearable device may identify the input 714 based on a gesture of touching and/or clicking a location in the map displayed through the screen 701. In response to the input 714 indicating that the location in the screen 701 is selected, the wearable device may display a screen 702 for adding a virtual camera to the location.

Referring to FIG. 7, illustrated is an example of the screen 702 displayed by the wearable device to add a virtual camera, which may be used for collecting media for the location selected by the input 714. In the screen 702, the wearable device may display a map 721 for visualizing the location selected by the input 714. When the virtual camera is located at another location adjacent to the location selected by the input 714, the wearable device may display the virtual camera in association with the another location on the map 721. In the screen 702, the wearable device may display a visual object 722 including a name (e.g., a place name and/or a street name) assigned to the location.

Referring to FIG. 7, in the screen 702, the wearable device may display a visual object 723 including information related to the virtual camera selected by the input 714. The information displayed with the visual object 723 may include at least one of a size (e.g., radius) of an area (e.g., the area 510 of FIG. 5) formed around the location selected by the input 714, a minimum resolution of media to be collected based on the location, a type (e.g., HMD and/or vehicle) of an electronic device to receive the media within the location, or an access permission to the media collected based on the location. The access permission may be selected from a first access level (e.g., private level) where only limited users are allowed to access, a second access level (e.g., protected level) where uploads of media are allowed but downloads are allowed only to specific users, and a third access level (e.g., public level), where all users are allowed to access. As understood by one of ordinary skill in the art, a virtual camera may be associated with any desired number of access levels. The wearable device may identify an input indicating that the information displayed through the visual object 723 is changed, in the screen 702. Based on the input, the wearable device may change the information. The access permission may refer to a user who is accessible to the media collected by the server based on the virtual camera. The access permission may refer to a sharing level of media. The information received by the wearable device through the screen 702 is not limited to the visual object 723 of FIG. 7. Accordingly, two users with different access levels may view different virtual environments in the same area. The wearable device may receive the shape of the area formed around the location selected by the input 714, through the screen 702. For example, the wearable device may receive an input indicating that a rectangular area having the location and another location on the map as vertices is formed. For example, the wearable device may receive an input indicating that the areas are in the form of concentric circles as in FIG. 5. While forming the area for collecting media, the wearable device may exclude a building and/or at least a portion of any area where media recording is restricted, from the area.

According to an embodiment, in the screen 702 of FIG. 7, the wearable device may display a visual object 724 having the form of a button for acknowledging or approving the addition of a virtual camera, based on the location selected by the input 714 and the information displayed through the visual object 723. In the screen 702, the wearable device may display a visual object 725 having the form of a button for canceling the addition of the virtual camera. In response to the input indicating that the visual object 724 is selected, the wearable device may transmit, to the server, a signal for adding the virtual camera based on the location selected by the input 714. Based on the signal, the server may add the virtual camera for an area with a radius included in the visual object 723, centering on the location. In one or more examples, the user may adjust any of the settings illustrated in the visual object 723 via one or more inputs in the virtual environment or one or more voice commands. The server adding the virtual camera may be performed based on the execution of the media server application 680 and/or the virtual camera manager 681 of FIG. 6.

Referring to FIG. 7, in response to the input indicating that the visual object 724 in the screen 702 is selected, the wearable device may transmit, to a server (e.g., the server 110 of FIGS. 5 and 6), a request for adding the virtual camera based on the information received through the screen 702. Based on the request, the server may add a virtual camera, which may be used for controlling the media recording, using an area including the location selected by the input 714. The server may add the virtual camera corresponding to the request based on whether the request has been transmitted by a user who is allowed to add the virtual camera. The server may add the virtual camera corresponding to the request based on whether the area set by the request is an area where media collection is allowed. Based on adding the virtual camera corresponding to the request, the server may request external electronic devices connected to the server to record and collect media based on the location and/or the area set by the request. The server may transmit, to the wearable device, a signal indicating that the virtual camera has been added based on the request. Based on receiving the signal, the wearable device may display a screen 703 indicating a result of adding the virtual camera based on the information received through the screen 702.

Referring to FIG. 7, the wearable device may display a visual object 732 indicating the virtual camera on the location corresponding to the input 714, in the map displayed through the screen 703. The wearable device may display a visual object 734 including data corresponding to the virtual camera, together with the visual object 732 having a pin shape. The wearable device may display information including an identifier assigned to the virtual camera in the visual object 734 having a bubble shape.

As described above, according to an embodiment, the wearable device may receive an input indicating that the virtual camera is added, from the user. Based on the input, the wearable device may request the server to add the virtual camera based on the input. Hereinafter, with reference to FIG. 8, description will be made of an example of operation of recording the media based on whether the wearable device has entered the area formed by the virtual camera, with the virtual camera being added based on the operation of FIG. 7.

Figure 8:
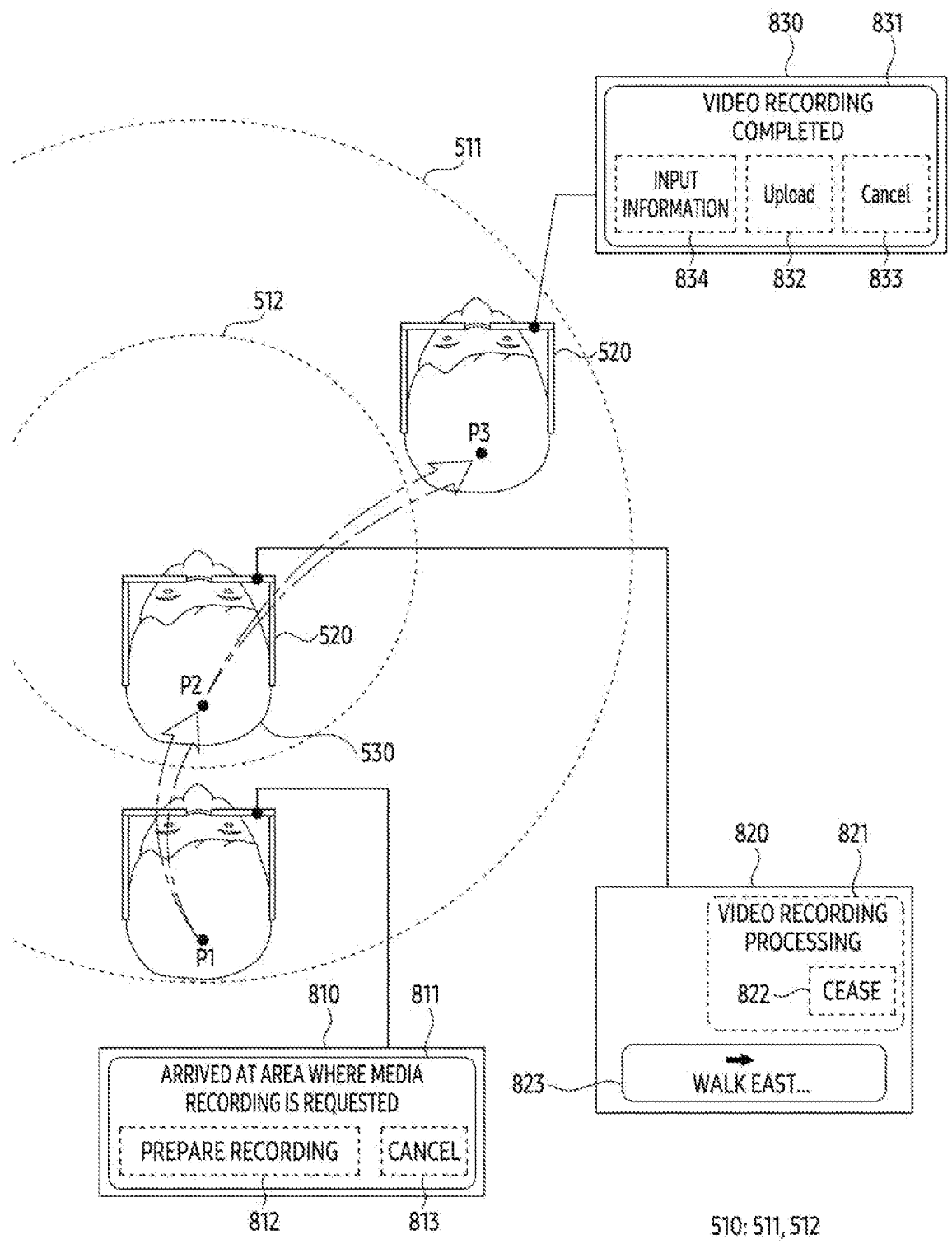
FIG. 8 illustrates an example of operation performed by a wearable device based on movement of the wearable device, according to one or more embodiments.

FIG. 8 illustrates an example of operation performed by the wearable device 520 based on movement of the wearable device 520, according to an embodiment. The wearable device 520 of FIG. 8 may include the wearable device 520 of FIGS. 5 and 6. The wearable device 520 of FIG. 8 may conditionally record the media based on execution of the media transmission application 670 of FIG. 6.

Referring to FIG. 8, the wearable device 520 may identify and/or monitor a location of the wearable device 520 based on data output from a sensor (e.g., the sensor 640 of FIG. 6). The wearable device 520 may identify or determine the location of the wearable device 520 based on data output from the sensor, which may be a GPS sensor. The wearable device 520 may receive, from the server (e.g., the server 110 of FIGS. 5 and 6), information including an area 510 for conditionally performing media recording. The area 510 may correspond to the virtual camera added based on the exemplary operation of FIG. 7. The area 510 may be divided into a first area 511 for preparing the media recording and a second area 512 for performing the media recording.

Referring to FIG. 8, the wearable device 520 may identify or determine whether the location of the wearable device 520 identified or determined based on the data of the sensor enters the first area 511, in the position P1. For example, while the wearable device 520 enters the position P1 from outside the first area 511, the wearable device 520 may identify or determine whether the location of the wearable device 520 crosses the boundary line of the first area 511. Based on identifying or determining the location (e.g., the position P1) of the wearable device 520 included in the first area 511 set by the external electronic device such as the server, the wearable device 520 may control a display (e.g., the display 630 of FIG. 6) to display a screen 810 in the FoV of the wearable device 520. The wearable device 520 may display, on the screen 810, a visual object 811 for adjusting the state of the camera (e.g., the camera 660 of FIG. 6) of the wearable device 520 to a first state for media recording. In the visual object 811, which may have the form of a pop-up window, the wearable device 520 may display a preset text (e.g., "arrived at an area where media recording is requested") for guiding entry into the first area 511. In the screen 810, the wearable device 520 may display visual objects 812 and 813 corresponding to different options for adjusting the state of the camera. In response to an input indicating that the visual object 812 is selected, the wearable device 520 may adjust the state of the camera to the first state. In response to an input indicating selecting of the visual object 813, the wearable device 520 may adjust the state of the camera to a second state different from the first state.

When entering the position P1 within the first area 511, the wearable device 520 may identify the state of the camera. When the state of the camera is different from the first state for media recording, the wearable device 520 may display the visual object 811 for adjusting the state of the camera to the first state on the screen 810. The other state different from the first state may include a state in which the camera is used by another application distinguished from the media transmission application. When the camera is used and/or occupied by the other application, the wearable device 520 may at least temporarily stop the use of the camera by the other application, in response to an input indicating that the visual object 812 is selected. The other state distinguished from the first state may include a state in which the usage of the memory (e.g., the memory 620 of FIG. 6) of the wearable device 520 exceeds a preset ratio in comparison to the entire capacity of the memory. The other state distinguished from the first state may include a state that a control of the camera based on the wearable device 520 is conditionally limited, for example, as in a power saving mode. After adjusting the camera of the wearable device 520 to the first state in response to an input indicating that the visual object 812 is selected, the wearable device 520 may monitor the location of the wearable device 520 to identify whether the location of the wearable device 520 enters the second area 512 for media recording.

Referring to FIG. 8, as the user 530 wearing the wearable device 520 moves to the position P2 in the second area 512, the wearable device 520 may identify or determined that the location of the wearable device 520 moves across the boundary line of the second area 512. Based on identifying the location of the wearable device 520 being moved into the second area 512, the wearable device 520 may control the camera in the first state to initiate media recording. Based on identifying the location of the wearable device 520 being moved into the second area 512 within the first area 511, based on the data of the sensor, the wearable device 520 may obtain media related to the second area 512. Referring to FIG. 8, while obtaining the media, the wearable device 520 may display a visual object 821 for informing the user that the media is being acquired, in a screen 820 displayed in the FoV of the user 530. Within the visual object 821, the wearable device 520 may display a visual object 822 having the form of a button for receiving an input indicating that acquisition of media is ceased.

According to an embodiment, in the state of recording the media, the wearable device 520 may request the user 530 to change the FoV of the media, based on the direction of the wearable device 520 in the second area 512. For example, the wearable device 520 may identify the direction of the FoV requested for recording of the media, based on the information corresponding to the virtual camera received from the server. The wearable device 520 may compare the direction of the camera in the wearable device 520 and the identified direction in the state of recording media. The direction of the camera may be identified or determined based on data of a sensor (e.g., an acceleration sensor and/or a geomagnetic sensor) of the wearable device 520. When the direction of the FoV included in the information is different from the direction of the camera of the wearable device 520, the wearable device 520 may display a visual object 823 for providing instructions to the user to change the direction of the camera (e.g., "Walk East") of the wearable device 520, within the screen 820. The visual object 823 may include text (e.g., "walk east") for guiding or instructing the user to change the direction of the camera of the wearable device 520 by walking in a particular direction. The wearable device 520 may display an image and/or an icon indicating the direction of the camera within the visual object 823. Referring to FIG. 8, an example of the wearable device 520 displaying an arrow in the visual object 823 is illustrated. The wearable device 520 may adjust the direction of the arrow displayed within the visual object 823, using a reference direction instructed by data from the geomagnetic sensor included in the wearable device 520.

According to an embodiment, based on receiving the information including the area 510 from the server (e.g., the server 110 of FIGS. 5 and 6), the wearable device 520 may compare the location of the wearable device 520 with the area 510 identified by the information to control media recording. For example, in the state of being disposed in the position P1, based on receiving the information, the wearable device 520 may identify or determine that the location of the wearable device 520 is included in the first area 511. In the above example, the wearable device 520 may display the visual object 811 for adjusting the state of the camera of the wearable device 520 to the first state for media recording or for switching the state to the first state. In one or more examples, in the state of being disposed in the position P2, based on receiving the information, the wearable device 520 may identify or determine that the location of the wearable device 520 is included in the second area 512. In one or more examples, the wearable device 520 may adjust the state of the camera of the wearable device 520 to the first state. In one or more examples, based on the state of the camera being adjusted to the first state, the wearable device 520 may control the camera to initiate acquiring of media.

According to an embodiment, recording the media based on the wearable device 520 entering the second area 512 may be interrupted by an input indicating whether the wearable device 520 moves out of the second area 512 and/or selecting the visual object 822 (e.g., "Cease"). Based on identifying or determining that the electronic device is moved out of the second area 512, at position P3, the wearable device 520 may cease recording the media. When the electronic device does not enter the first area 511 and/or the second area 512 within a preset period after moving out of the second area 512, the wearable device 520 may cease recording the media. The wearable device 520 may store media recorded in the second area 512 in the memory of the wearable device 520.

According to an embodiment, the wearable device 520 may perform post-processing on the media when the media is stored in the memory of the wearable device 520. The post-processing may include adjusting brightness of the media and/or compressing the media. The post-processing may include generating metadata corresponding to the media. The above-described post-processing may be performed not only by the wearable device 520, but also by the external electronic device (e.g., the server 110 of FIGS. 5 and 6) receiving the media.

According to an embodiment, the wearable device 520 may transmit the media to an external electronic device such as a server via a communication circuitry (e.g., the communication circuitry 650 of FIG. 6). The transmitting of the media by the wearable device 520 to the server may be performed conditionally based on an input of the user 530 and/or a state of the wearable device 520 (e.g., usage of a battery and/or data of the wearable device 520). The wearable device 520 may automatically adjust uploading of the media based on the access permission set for the virtual camera corresponding to the area 510. For example, when the media is recorded based on the area corresponding to the virtual camera of the first access permission (e.g., private level), the wearable device 520 may automatically transmit the media to the server when the user 530 of the wearable device 520 corresponds to the user selected by the first access permission. In one or more examples, when the media is recorded based on the area corresponding to the virtual camera of the second access permission (e.g., protected level), the wearable device 520 may conditionally transmit the media based on an input of the user 530.

Referring to FIG. 8, the wearable device 520 may display, in a screen 830, a visual object 831 for identifying whether to transmit the media to the server. In one or more examples, the visual object 831 may include a visual object 832 having the form of a button for transmitting the media. The wearable device 520 may display a visual object 834 for obtaining information on the media. The wearable device 520 may display a visual object 833 for ceasing and/or delaying transmission of the media.

According to an embodiment, the wearable device 520 may generate metadata corresponding to the media when the media is being recorded in the second area 512. The wearable device 520 may identify or determine at least one category corresponding to the media among categories for classifying at least one event. The categories may be set to classify conditions recorded by the media, such as a vehicle collision, a fire, and/or a concert. The wearable device 520 may store metadata including information indicating the at least one event based on the identified or determined at least one category, together with the media. The metadata may include a location where the media is recorded (e.g., the location of the wearable device 520 in the second area 512). The metadata may include at least a portion of data from the sensor of the wearable device 520 while the media is recorded. The metadata may include information indicating the FoV of the camera while obtaining the media. The metadata may include information on the media (e.g., a tag for the media and/or a name of at least one user included in the media) received from the user, based on an input indicating selecting the visual object 834. The metadata may include an access permission to the media. The metadata may include a length of the media, a quality of the media, and/or a resolution thereof.

According to an embodiment, the wearable device 520 may transmit the media to the server based on an input indicating that the visual object 832 is selected. The wearable device 520 may transmit at least a portion of metadata corresponding to the media, along with the media transmitted to the server. The transmitting of the media to the server by the wearable device 520 may include both transmitting the media stored in the memory and streaming the media obtained from the camera. The wearable device 520 may request the server to store the media stored in the wearable device 520 as the media for the virtual camera corresponding to the second area 512. Although the above description has been made of an example embodiment of recording and uploading the media based on the wearable device 520 that is wearable on the head of the user 530, the present disclosure is not limited to these configurations. For example, the operation of recording and uploading the media of FIG. 8 may be performed based on a dashcam (e.g., a black box) of a vehicle, a camera of a smartphone, or any other device with recording capability.

According to an embodiment, the server receiving the media from the wearable device 520 may provide a compensation to the wearable device 520 and/or the user logged in to the wearable device 520. The compensation may be stored in account information corresponding to the user logged in to the wearable device 520. The compensation may be set by another user who has added the virtual camera corresponding to the area 510. The compensation may be provided by a virtual currency and/or a smart contract stored in a blockchain.

As described above, according to an embodiment, the wearable device 520 may automatically perform recording and uploading of the media based on the area 510 set by the server. The server may collect media from the electronic devices entering the area 510, including the wearable device 520. Based on the media, the server may classify the media, based on an event included in the media. Based on the media, the server may synthesize the media with another media different from the media. Based on the media, the server may support searching for media based on a geographically selected area, such as the area 510.

Hereinafter, an example of operation in which a server connected to the wearable device 520 synthesizes a plurality of media including media received from the wearable device 520 will be described with reference to FIG. 9.

Figure 9:
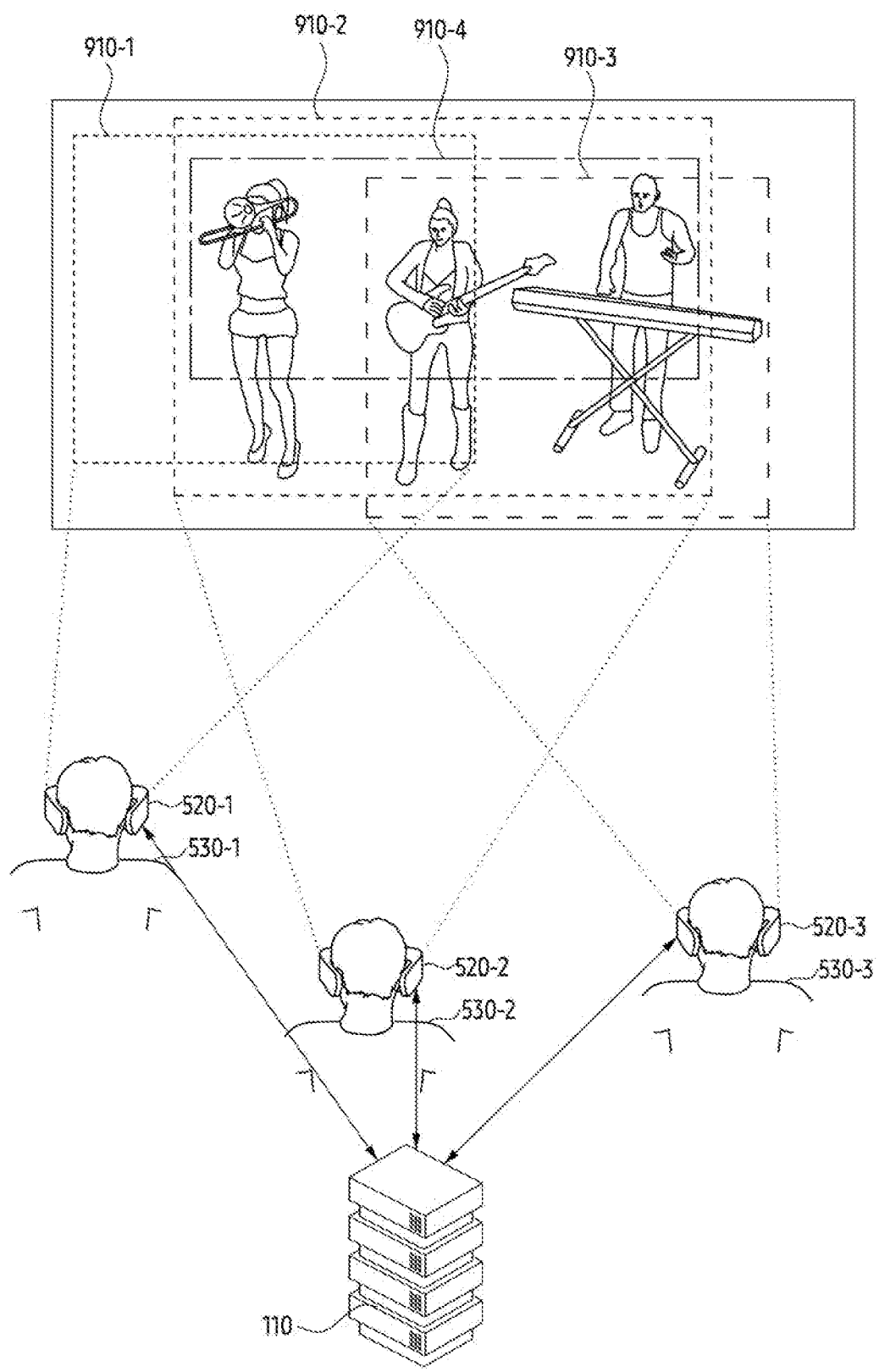
FIG. 9 illustrates an example of operation, by a server connected to wearable devices, of processing media received from the wearable devices, according to one or more embodiments.

FIG. 9 illustrates an example of operation, by the server 110 connected to one or more wearable devices and processing the media received from the one or more wearable devices, according to an embodiment. The server 110 of FIG. 9 may include the server 110 of FIGS. 5 and 6. Referring to FIG. 9, illustrated is an exemplary case of the server 110 receiving the media from the plurality of wearable devices 520-1, 520-2, and 520-3 included in an area (e.g., an area corresponding to a virtual camera) set by the server 110. Each of the wearable devices 520-1, 520-2, and 520-3 may have a form of an HMD worn by each of different users 530-1, 530-2, and 530-3. The server 110 may receive media from the plurality of wearable devices 520-1, 520-2, and 520-3 based on execution of the media server application 680 of FIG. 6 with respect to each wearable device.

According to an embodiment, the server 110 may obtain media for a preset area and metadata corresponding to the media from the wearable devices 520-1, 520-2, and 520-3, based on a communication circuit (e.g., the communication circuitry 650 of FIG. 6). The media may be recorded by each of the wearable devices 520-1, 520-2, and 520-3 based on whether the respective wearable device has entered a preset area. The server 110 may identify or determine, based on the metadata, at least one media including an event that occurred within the preset area, amongst the media for the preset area. For example, based on the metadata, the server 110 may identify or determine the media recorded while the event has been generated, by comparing a time when the media corresponding to the metadata was recorded and a time when the event occurred. Upon receiving the media from the wearable devices 520-1, 520-2, and 520-3, the server 110 may perform the post-processing operation described above with reference to FIG. 7, for the media. Upon receiving the media from the wearable devices 520-1, 520-2, and 520-3, the server 110 may perform synchronization for the media based on execution of the media synchronizer 683 of FIG. 6. For example, the media from each of wearable devices 520-1, 520-2, and 520-3 may be associated with a respective time stamp used to synchronize each of the media.

Referring to FIG. 9, it is assumed that the server 110 identifies or determines the media received from the wearable devices 520-1, 520-2, and 520-3 as the media including the event generated in the preset area. When the number of media including the event exceeds a preset threshold or the number of media recorded in the preset area exceeds the preset threshold, the server 110 may synthesize new media from the media. The server 110 may synthesize the new media from the media based on the number of media having a preset quality and/or resolution. The media received from the wearable devices 520-1, 520-2, and 520-3 may have different FoVs, respectively. The server 110 may obtain another media (e.g., synthesized media) having a photographing area 910-4 different from photographing areas 910-1, 910-2, 910-3, based on the photographing areas 910-1, 910-2, 910-3 formed by the FoV of each of the media. In one or more examples, the photographing area 910-4 may be a composite of photographing areas 910-1, 910-2, 910-3 to form a complete scene. The server 110 may store the other media in the memory of the server 110, together with the wearable devices 520-1, 520-2, and 520-3. The server 110 may store the other media, based on a state accessible by at least one external electronic device connected to the server 110 (e.g., a state that may be searched by the at least one external electronic device).

Referring to FIG. 9, illustrated is an exemplary case that the server 110 selects the photographing area 910-4 to be used for synthesizing the media, based on the photographing areas 910-1, 910-2, and 910-3 of the media received from the wearable devices 520-1, 520-2, and 520-3. The server 110 may identify a point where an event occurred in an area where the media were recorded, from metadata on the media. The server 110 may identify the FoV facing the identified point, based on directions of the FoVs of each of the media. The photographing area 910-4 formed by the FoV identified by the server 110 may have a direction suitable for recording the event. For example, the photographing area 910-4 may be adjusted by the server 110 based on whether the event is covered. Based on the identified photographing area 910-4, the server 110 may synthesize the media, thereby synthesizing other media having the photographing area 910-4. The server 110 may store in the memory the media and the synthesized other media in association with the event.

As described above, the server 110 receiving the media from a plurality of external electronic devices (e.g., the wearable devices 520-1, 520-2, and 520-3) may synthesize the media. The synthesized media may have the photographing area 910-4 overlapping at least two FoVs amongst the photographing areas 910-1, 910-2, and 910-3 of each of the media. The synthesizing of the media by the server 110 may include synthesizing the media displayed in parallel through a single frame, such as collage, in addition to synthesizing the media having a new FoV different from the photographing regions 910-1, 910-2, and 910-3 of the media.

Hereinafter, referring to FIGS. 10 and 11, description will be made of an example of operation in which the server 110 searches for a plurality of media stored in the server 110, based on a request from an external electronic device such as a wearable device.

Figure 10:
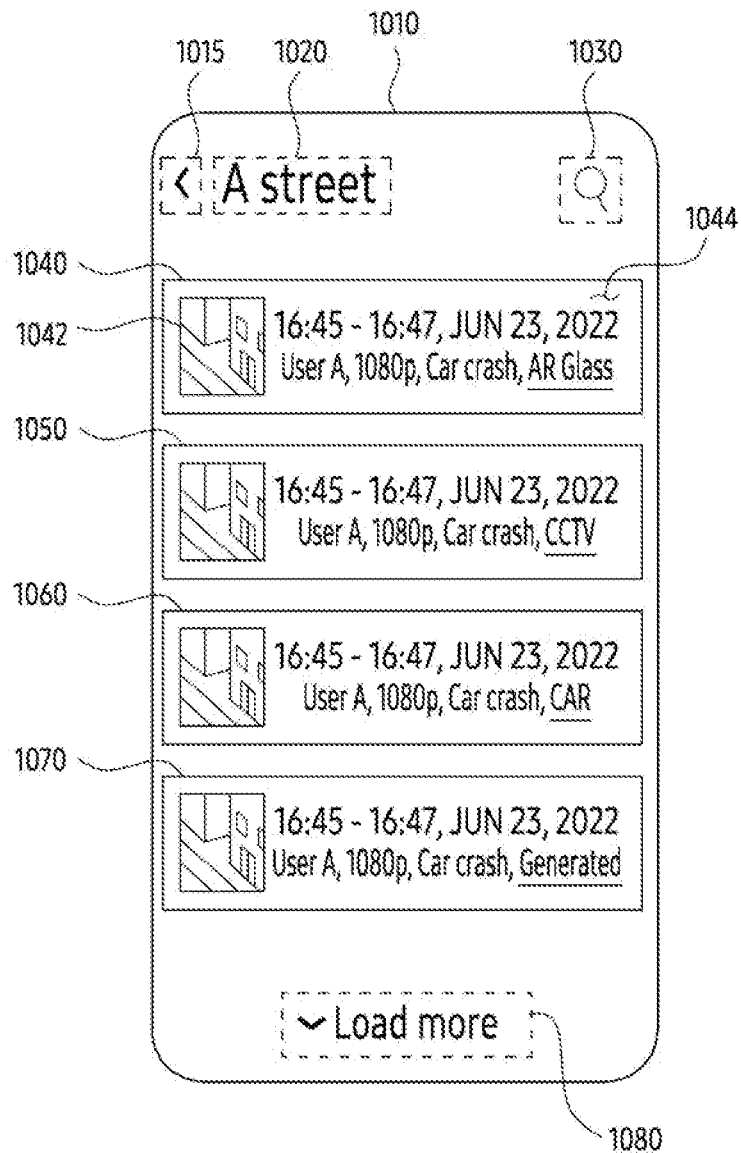
FIG. 10 illustrates an example of operation, by a wearable device, of displaying a list of media captured at a preset location, according to one or more embodiments.

FIG. 10 illustrates an example of operation by a wearable device of displaying a list of media captured at a preset location, according to an embodiment. The wearable device of FIG. 10 may include the wearable device 520 of FIGS. 5 and 6. Referring to FIG. 10, illustrated is a screen 1010 displayed by a wearable device to search for media, based on execution of an application including a media transmission application (e.g., the media transmission application 670 of FIG. 6). The screen 1010 may be displayed by the wearable device connected to the server 110 of FIGS. 5 and 6. For example, the screen 1010 may be viewed in at least a portion of the FoV of the user through the display of the wearable device while the user (e.g., the user 530 of FIG. 5) is wearing the wearable device.

Referring to an embodiment of FIG. 10, the wearable device may display a screen 1010 including a list of media recorded in a geographically specified area, based on one or more virtual cameras provided by a server connected to the wearable device and/or text input by a user of the wearable device (e.g., text representing a place name, an event, and/or a FoV). Based on receiving, from the wearable device, a signal for searching for the media stored in the server, the server may transmit information for displaying a list including at least one media in the screen 1010, in response to the signal. In the screen 1010, the wearable device may display a visual object 1020 including a name (e.g., a place name) of an area corresponding to the list. In the screen 1010, the wearable device may display a visual object 1015 having the form of a button for switching to another screen displayed before the screen 1010. In the screen 1010, the wearable device may display a visual object 1030 having the form of an icon for receiving text (e.g., a keyword) for searching for media from a user.

Referring to an embodiment, in the screen 1010, the wearable device may display a list of recorded media in an area having the name included in the visual object 1020 as a place name. The wearable device may display visual objects 1040, 1050, 1060, and 1070 respectively corresponding to the media included in the list, in the screen 1010. The visual objects 1040, 1050, 1060, and 1070 may be referred to as items and/or cards included in the list. In one or more examples, the wearable device may display thumbnails corresponding to each of the media included in the list such as thumbnails 1042, 1050, 1060, and 1070, which provide a preview of the media. In one or more examples, the wearable device may display information on the media included in the list such as text included in the visual object 1040.

According to an embodiment, referring to the text 1044 in the visual object 1040, the wearable device may display at least one of a time at which the media corresponding to the visual object 1040 has been recorded, a user who recorded the media, an event (e.g., a car crash) contained in the media, and/or a type (e.g., AR glass) of the electronic device which recorded the media. Referring to FIG. 10, the server collects the media from external electronic devices having various form factors, and therefore, the list displayed on the screen 1010 may include the media recorded in various external electronic devices (e.g., AR glass, CCTV, and vehicle). Since the server synthesizes new media from the collected media, based on the operation described above with reference to FIG. 9, the list displayed on the screen 1010 may include the media synthesized by the server, as in a visual object 1070. In the visual object 1070, the wearable device may display text (e.g., "generated") indicating that the media corresponding to the visual object 1070 is synthesized media. Embodiments of the disclosure are not limited thereto, and the wearable device may display, in the text 1044, the FoV (e.g., a viewing angle of FoV displayed based on at least one of roll, yaw, or pitch) of the media corresponding to the visual object 1040. In the screen 1010, the wearable device may display a visual object 1080 for displaying other media not displayed in the screen 1010 amongst the media included in the list.

Referring to an embodiment, the wearable device may identify an input indicating that the media included in the list is replayed, based on the list displayed in the screen 1010. In response to the input, the wearable device may display the media corresponding to the input. To display the media in the FoV of the user, the wearable device may transmit, to a server, a signal for streaming and/or transmitting the media corresponding to the input. Based on receiving the media from the server in response to the signal, the wearable device may display the received media.

According to an embodiment, searching for media by the wearable device is not limited to the embodiment of searching for the media stored in the server, as illustrated in FIG. 10. Hereinafter, according to an embodiment, an example of operation by a wearable device searching for media based on an area and/or an event from a server will be described with reference to FIG. 11.

Figure 11:
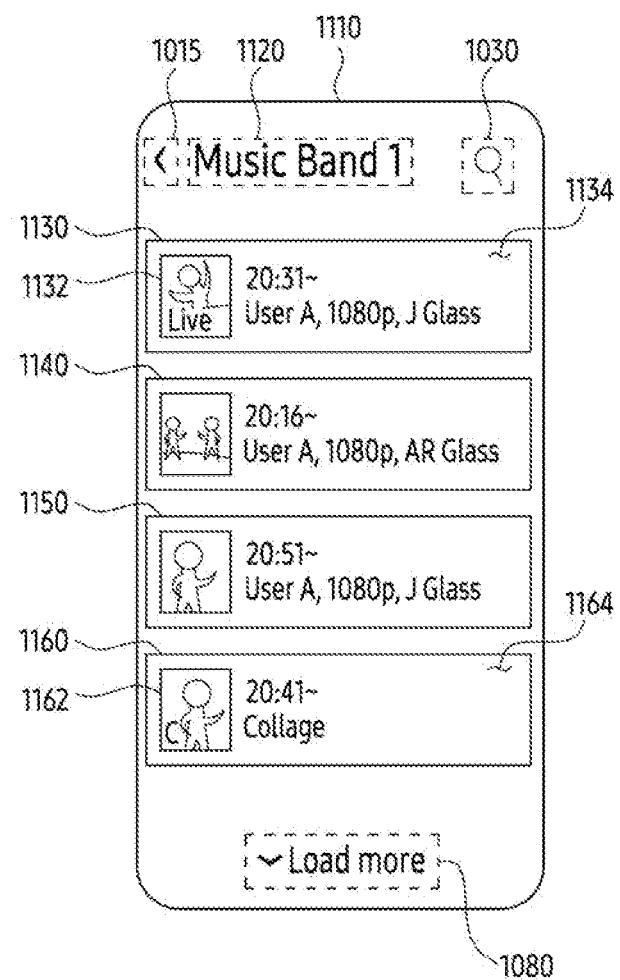
FIG. 11 illustrates an example of operation, by a wearable device, of displaying a list of media captured at a preset location, according to one or more embodiments.

FIG. 11 illustrates an example of operation by a wearable device displaying a list of media captured at a preset location, according to an embodiment. The wearable device of FIG. 11 may include the wearable device 520 of FIGS. 5 and 6. Referring to FIG. 11, illustrated is a screen 1110 displayed by a wearable device to search for media, based on execution of an application including a media transmission application (e.g., the media transmission application 670 of FIG. 6). The screen 1110 may be displayed by the wearable device connected to the server 110 of FIGS. 5 and 6. For example, the screen 1110 may be viewed in at least a portion of the FoV of the user through the display of the wearable device, while the user (e.g., the user 530 of FIG. 5) is wearing the wearable device.

According to an embodiment, the wearable device may transmit, to the server, a signal for searching for media about an event that has occurred or is occurring in an area. Referring to FIG. 11, the wearable device may display, on a screen 1110, a list of media received from the server in response to the signal. In the screen 1110, the wearable device may display a visual object 1015 for receiving an input indicating switching to a previous other screen before displaying the current screen 1110. In the screen 1110, the wearable device may display a visual object 1120 including a name of an event corresponding to the list. In the visual object 1120, the wearable device may connect the name of the event (e.g., a name of a certain music concert such as "Drum Sound") and the name of the place where the event occurred (e.g., "Seoul"), based on a preset delimiter (e.g., "A"). In the screen 1110, the wearable device may display a visual object 1030 for receiving a keyword from the user.

According to an embodiment, in the screen 1110, the wearable device may display a list of media including the event specified by the visual object 1120. The list may include media stored in a server connected to the wearable device or capable of streaming by the server. In the screen 1110, the wearable device may display visual objects 1130, 1140, 1150, and 1160 corresponding to the media included in the list. In the screen 1110, the wearable device may display a visual object 1080 for viewing the other media in the list different from the media currently displayed through the screen 1110. In one or more examples, the wearable device may display thumbnails representing media in the list in the screen 1110 such as thumbnail 1132 in the visual object 1130. In one or more examples, the wearable device may display information about the media in the list in the screen 1110 such as text 1134 in the visual object 1130.

According to an embodiment, referring to the thumbnail 1132 in the visual object 1130, the wearable device may include text (e.g., "Live") indicating that the media corresponding to the visual object 1130 is being recorded in real time based on streaming. In response to an input indicating that the visual object 1130 is selected, the wearable device may request streaming of the media from a server or an external electronic device that records the media corresponding to the visual object 1130. Based on the request, the wearable device may output the media corresponding to the visual object 1130. The wearable device outputting the media corresponding to the visual object 1130 may be performed conditionally until streaming of the media is completed. Referring to the text 1134 in the visual object 1130, the wearable device may display text indicating the time when recording of the media began, a name of the user recording the media, a resolution of the media, and/or a type of the electronic device recording the media.

In an embodiment, referring to the thumbnail 1162 in the visual object 1160, the wearable device may include text (e.g., "C") indicating that the media corresponding to the visual object 1160 is media obtained by synthesizing a plurality of media with a person related to the event corresponding to the list displayed on the screen 1110 being recorded therein. For example, the media corresponding to the visual object 1160 may be media obtained by synthesizing the plurality of media based on a preset media effect such as, collage. The server providing the list may synthesize media associated with the same person amongst the media, based on a similarity between the persons associated with the media. The visual object 1160 may represent the media synthesized by the server based on the similarity between persons. The thumbnail 1162 in the visual object 1160 may correspond to a thumbnail including the person, a thumbnail of media having the highest resolution amongst the media, or a thumbnail of media that is being transmitted to the most electronic devices amongst the media.

According to an embodiment, in response to an input indicating that the visual object 1160 is selected, the wearable device may output a plurality of media corresponding to the visual object 1160 and connected based on collage. The outputting of the plurality of media by the wearable device may be controlled by the server transmitting the plurality of media to the wearable device. For example, amongst the plurality of media, media that no longer captures a person corresponding to the visual object 1160 may be excluded.

As described above, according to an embodiment, the wearable device and the server may perform functions for recording and/or searching for the media based on a geographically selected area. The server may manage the area for recording media based on a virtual camera. The wearable device may control the camera of the wearable device, utilizing concentrically subdivided areas (e.g., the first area 511 and the second area 512 of FIG. 5) within the area. The server may classify the media received from a plurality of electronic devices including the wearable device based on the locations where the media were recorded and different events included in the media. Based on the result of classifying the media, the server may perform searching, downloading, and/or streaming of the media.

Hereinafter, operations of the wearable device and the server described above will be described with reference to FIGS. 12, 13 and 14.

Figure 12:
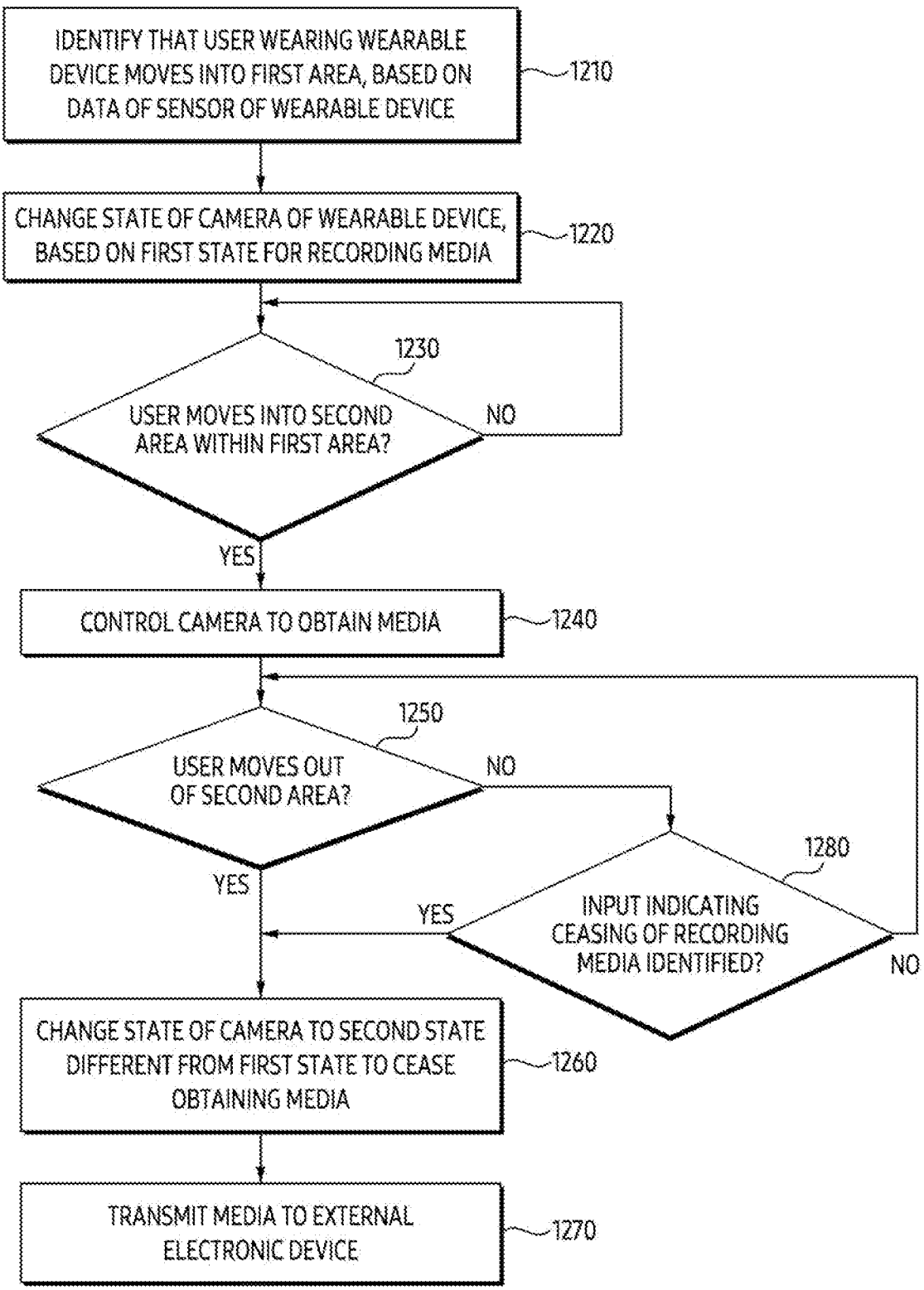
FIG. 12 illustrates a flowchart of an example operation method of a wearable device according to one or more embodiments.

FIG. 12 is a flowchart illustrating an example of operation of a wearable device according to an embodiment. The wearable device of FIG. 12 may include the wearable device 520 of FIGS. 5 and 6. For example, one or more of the operations of FIG. 12 may be performed by the wearable device 520 of FIG. 6 and/or the processor 610 of the wearable device 520. One or more of the operations of FIG. 12 may be performed by the wearable device, based on execution of the media transmission application 670 of FIG. 6. In the following embodiments, each operation may be performed sequentially, but may not be necessarily performed sequentially. For example, the order of operations may be changed, and at least two operations may be performed in parallel.

Referring to FIG. 12, according to an embodiment, in operation 1210, the wearable device may identify or determine that a user (e.g., the user 530 of FIG. 5) wearing the wearable device moves into a first area (e.g., the first area 511 of FIG. 5), based on data of the sensor (e.g., the sensor 640 of FIG. 6) of the wearable device. The wearable device may receive information indicating the first area from an external electronic device (e.g., the server 110 of FIGS. 5 and 6) connected to the wearable device, before the operation 1210. For example, the wearable device may identify whether GPS coordinates of the wearable device included in the data of the sensor are located in the first area and/or a geofence related to the first area.

According to an embodiment, when the wearable device is moved into the first area, based on operation 1220, the wearable device may change the state of the camera (e.g., the camera 660 of FIG. 6) of the wearable device based on the first state for recording media. The first state may include a state that the camera is activated to record media. The first state may include a state that the camera of the wearable device is occupied by a preset application (e.g., the media transmission application 670 of FIG. 6) for recording and uploading media based on the first area.

According to an embodiment, referring to FIG. 12, in operation 1230, the wearable device may determine whether the user moves into a second area (e.g., the second area 512 of FIG. 5) within the first area. The wearable device may identify or determine whether the user wearing the wearable device enters the second area, by comparing a location of the wearable device with the second area, based on data of the sensor. Before the user moves into the second area (operation 1230—No), the wearable device may maintain the state of the camera in the first state.

According to an embodiment, in response to identifying or determining that the user moves into the second area (operation 1230—YES), in operation 1240, the wearable device may control the camera to obtain the media. Since the camera has been changed to the first state from the state 1220 before moving into the second area, the wearable device may initiate recording of media more quickly in operation 1240. Based on operation 1240, the wearable device may acquire media corresponding to the second area, independently of a user input such as a shooting input. In one or more examples, while acquiring the media in the second area, the wearable device may monitor the location of the wearable device and/or the user wearing the wearable device, using the data of the sensor.

According to an embodiment, referring to FIG. 12, in operation 1250, the wearable device may determine whether the user moves out of the second area. If it is determined the user does not move out of the second area, (operation 1250—NO), the wearable device according to an embodiment may determine whether an input indicating that recording of the media is ceased based on operation 1280. The input may be received based on the visual object 822 of FIG. 8. When the user is located in the second area and the input of operation 1280 (operation 1280—NO) is not identified, the wearable device may maintain obtaining the media based on operation 1240.

According to an embodiment, in response to identifying that the user moves out of the second area (operation 1250—YES), in operation 1260, the wearable device may change the state of the camera to the second state different from the first state to stop obtaining or recording of the media. For example, based on operation 1260, the wearable device may complete recording of the media based on operation 1240. As the recording of the media is completed, the wearable device may perform a post-processing operation on the media. As the recording of the media is completed, the wearable device may obtain metadata corresponding to the media.

According to an embodiment, referring to FIG. 12, in operation 1270, the wearable device may transmit the media to the external electronic device. For example, the wearable device may transmit the media to the server 110 of FIGS. 5 and 6. The wearable device may transmit metadata corresponding to the media, together with the media, to the external electronic device.

Figure 13:
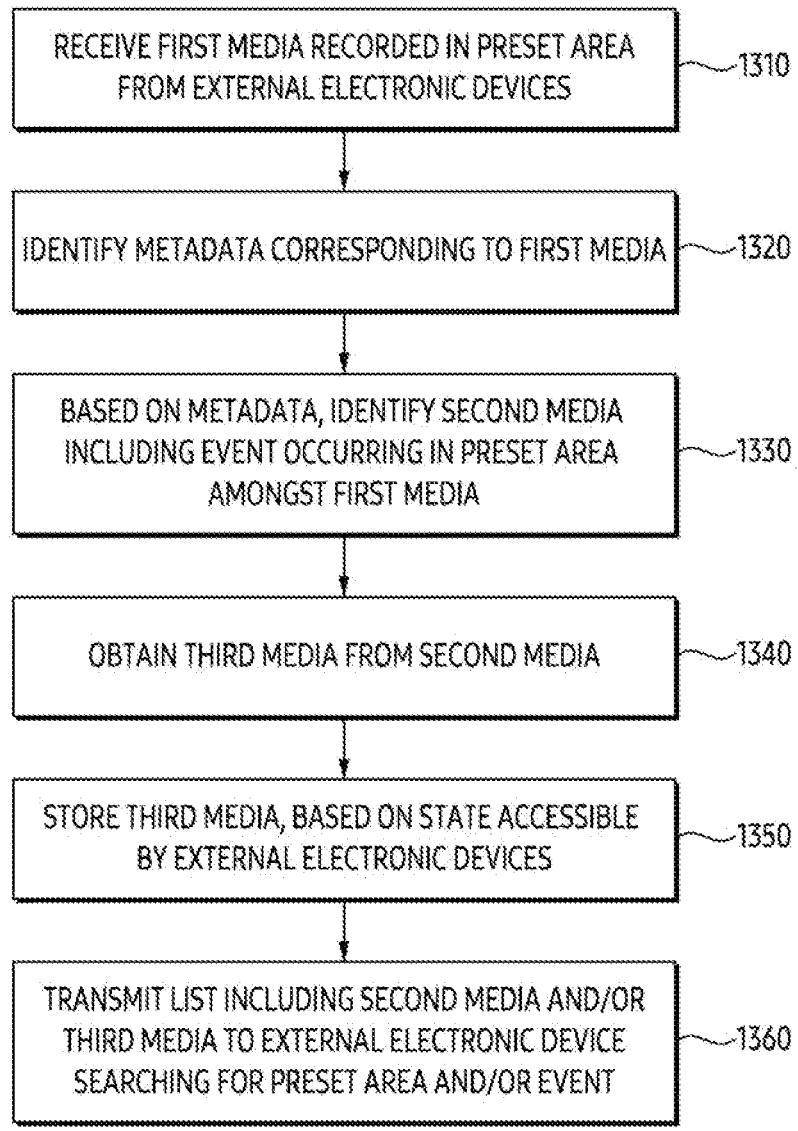
FIG. 13 illustrates a flowchart of an example operation method of an electronic device according to one or more embodiments.

FIG. 13 illustrates a flowchart of an example operation of an electronic device according to an embodiment. The electronic device of FIG. 13 may include the server 110 of FIGS. 5 and 6. For example, one or more of operations of FIG. 13 may be performed by the server 110 of FIG. 6 and/or the processor 610 of the server 110. The operation of the electronic device of FIG. 13 may be related to at least one of the operations of FIG. 12. For example, the electronic device of FIG. 13 may include the external electronic device of operation 1270 of FIG. 12. One or more of the operations of FIG. 13 may be performed based on execution of the media server application 680 of FIG. 6. In the following embodiments, each operation may be performed sequentially, but may not be necessarily performed sequentially. For example, the order of each operation may be changed, and at least two operations may be performed in parallel.

According to an embodiment, referring to FIG. 13, in operation 1310, the electronic device may receive first media recorded in a preset area from external electronic devices. The external electronic device of operation 1310 may include the wearable device 520 of FIGS. 5 and 6. The preset area may include the area 510 of FIG. 5. For example, the preset area of operation 1310 may be set based on the operation described above with reference to FIG. 7. The first media of operation 1310 may be recorded by the operation of the wearable device 520 described above with reference to FIGS. 5, 8, and/or 12.

According to an embodiment, referring to FIG. 13, in operation 1320, the electronic device may identify or determine metadata corresponding to the first media. The electronic device may receive metadata from the external electronic devices, together with the first media received based on operation 1310. The electronic device may obtain the metadata corresponding to the first media, based on execution of the media analyzer 682 in the media server application 680 of FIG. 6.

According to an embodiment, referring to FIG. 13, in operation 1330, the electronic device may identify, based on metadata, second media including an event occurring in a preset area, amongst the first media. The electronic device may identify or determine the second media recorded within a time interval in which the event occurs, based on metadata of the first media.

According to an embodiment, referring to FIG. 13, in operation 1340, the electronic device may obtain third media from the second media. Based on the FoVs of the second media, the electronic device may obtain the third media having a FoV different from the FoVs. Based on the operation described above with reference to FIG. 9, the electronic device may obtain the third media having the FoV corresponding to the event of operation 1330, based on synthesizing with respect to the second media.

According to an embodiment, referring to FIG. 13, in operation 1350, the electronic device may store the third media, based on a state that is accessible by external electronic devices. The state may refer to storing the third media in a state that can be searched by the external electronic devices connected to the electronic device. Based on operation 1350, the electronic device may store the third media together with the second media. For example, the electronic device may store the third media together with the second media, in a category corresponding to the event of operation 1330. The storing of the third media by the electronic device may include, based on a database, matching information used for searching for the third media to the third media to store the information.

According to an embodiment, referring to FIG. 13, in operation 1360, the electronic device may transmit a list including the second media and/or the third media to an external electronic device that searches for a preset area and/or an event. Based on the list transmitted by the electronic device, the external electronic device may display the screens 1010 and 1110 illustrated with reference to FIGS. 10 and 11.

Figure 14:
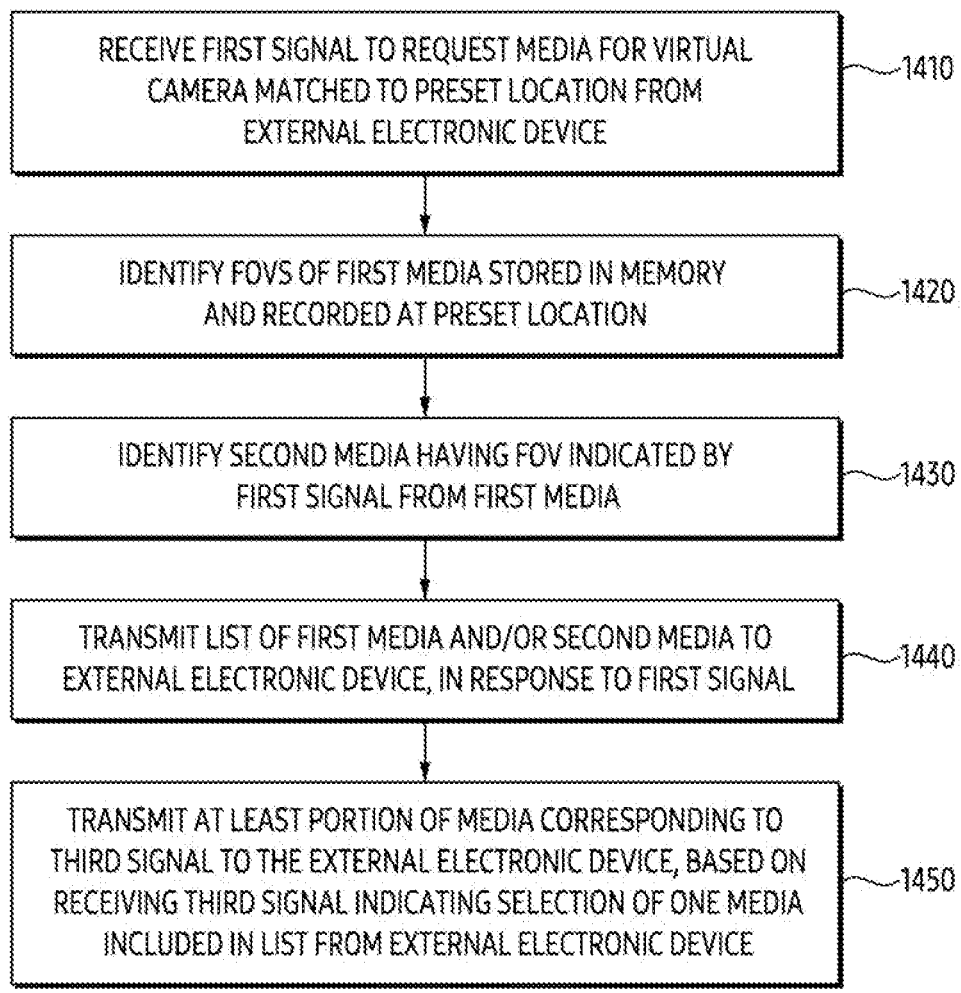
FIG. 14 illustrates a flowchart of an example operation method of an electronic device according to one or more embodiments.

FIG. 14 illustrates a flowchart of an example operation of an electronic device according to an embodiment. The electronic device of FIG. 14 may include the server 110 of FIGS. 5 and 6. For example, one or more of the operations of FIG. 14 may be performed by the server 110 of FIG. 6 and/or the processor 610 of the server 110. In the following embodiments, each operation may be performed sequentially, but may not be necessarily performed sequentially. For example, the order of each operation may be changed, and at least two operations may be performed in parallel. The operation of the electronic device of FIG. 14 may be related to at least one of the operations of FIG. 13. For example, the operation of the electronic device of FIG. 14 may be related to the operation 1360 of FIG. 13.

According to an embodiment, referring to FIG. 14, in operation 1410, the electronic device may receive a first signal for requesting media for a virtual camera matched to a preset location, from the external electronic device. In operation 1410, the external electronic device may include the wearable device 520 of FIGS. 5 and 6. As illustrated in the screens 701 and 703 of FIG. 7, the first signal may include an input received by the external electronic device displaying a UI for selecting a virtual camera based on a map. As illustrated in the screens 1010 and 1110 of FIGS. 10 and 11, the first signal may include a keyword and/or text that the external electronic device received from the user.

According to an embodiment, referring to FIG. 14, in operation 1420, the electronic device may identify the FoVs of the first media stored in the memory and recorded at a preset location. The memory in operation 1420 may include the memory 620 in the server 110 of FIG. 6. Based on operation 1420, the electronic device may select the first media recorded at the preset location selected by the first signal of operation 1410, from among a plurality of media stored in the memory. The electronic device may identify the FoVs of the first media from metadata corresponding to the first media.

According to an embodiment, referring to FIG. 14, in operation 1430, the electronic device may identify or determine, from among the first media, the second media having the FoV indicated by the first signal. The electronic device may compare the FoVs identified based on operation 1420 with a FoV indicated by the first signal to identify the second media of operation 1430.

According to an embodiment, based on identifying or determining the second media, in operation 1440, the electronic device may transmit a list of the first media and/or the second media to the external electronic device, in response to the first signal. The electronic device may transmit a signal indicating to visualize the list, together with the list, to an external electronic device. Upon receiving the signal, the external electronic device may visualize the list, as illustrated in the screens 1010 and 1110 of FIGS. 10 and 11. In response to an input indicating that a specific media is selected from the list, the external electronic device may transmit, to the electronic device, a signal requesting the electronic device to transmit the media selected by the input.

According to an embodiment, referring to FIG. 14, in operation 1450, the electronic device may transmit at least a portion of the media corresponding to the third signal to the external electronic device, based on receiving the third signal indicating selection of one media included in the list from the external electronic device. The third signal may be transmitted from the external electronic device to the electronic device, based on an input indicating selecting one media included in the list of operation 1440, being identified or determined by the external electronic device. Based on receiving the third signal, the electronic device may transmit and/or stream the media included in the third signal, to the external electronic device.

According to an embodiment, a method of recording media based on the location of the wearable device, using the camera of the wearable device, is provided. As described above, according to an embodiment, a wearable device (e.g., the wearable device 520 of FIGS. 5 and 6) may include a display (e.g., the display 630 of FIG. 6), a camera (e.g., the camera 660 of FIG. 6), a sensor (e.g., the sensor 640 of FIG. 6), communication circuitry (e.g., the communication circuitry 650 of FIG. 6), and a processor (e.g., the processor 610 of FIG. 6). The processor may be configured to identify or determine a location of the wearable device based on data outputted from the sensor. The processor may be configured to display, in a FoV(field-of-view) of the wearable device, by controlling the display based on identifying or determining that the location is included in a first area (e.g., the first area 511 of FIG. 5) set by an external electronic device through the communication circuitry, a visual object (e.g., the visual object 811 of FIG. 8) for adjusting a state of the camera to a first state for recording media (e.g., the media 540 of FIG. 5). The processor may be configured to adjust, in response to an input indicating to select the visual object, a state of the camera to the first state. The processor may be configured to obtain, based on identifying that the location is moved into a second area (e.g., the second area 512 of FIG. 5) in the first area based on the data, media associated with the second area based on the camera of which state is adjusted to the first state. The processor may be configured to transmit the obtained media to the external electronic device (e.g., the server 110 of FIGS. 5 and 6) through the communication circuitry. The wearable device may automatically record media for the area, based on whether the wearable device has entered the area.

For example, the processor may be configured to identify or determine, among categories for classifying at least one event recorded by the media, at least one category corresponding to the media. The processor may be configured to transmit, to the external electronic device, information indicating the at least one event based on the at least one category with the media.

For example, the processor may be configured to transmit, to the external electronic device, the media together with the data for identifying the location.

For example, the processor may be configured to identify or determine, after obtaining the media, another input indicating to input information with respect to the media. The processor may be configured to transmit, to the external electronic device, the media with the information identified or determined by the another input.

For example, the processor may be configured to transmit, to the external electronic device, the media with information indicating the FoV of the camera while obtaining the media.

For example, the processor may be configured to transmit, based on an input indicating to select a second visual object for transmitting the obtained media, the second visual object being different from the visual object that is a first visual object, the media to the external electronic device.

For example, the processor may be configured to identify or determine, based on the data outputted from the sensor which is a global positioning system (GPS) sensor, whether a geographic location of the wearable device crosses a border line of the first area.

For example, the processor may be configured to cease at least temporarily, in response to the input, controlling of the camera based on another application different from a preset application (e.g., the media transmission application 670 of FIG. 6) for obtaining the media.

For example, the processor may be configured to display, based on a direction of the camera in the second area identified or determined by the data, a second visual object (e.g., the visual object 823 of FIG. 8) for guiding the direction of the camera, the second visual object being different from the visual object which is a first visual object in the FoV through the display.

As described above, according to an embodiment, a method of an electronic device may include obtaining, from external electronic devices based on a communication circuitry of the electronic device, first media with respect to an area and metadata corresponding to the first media. The method may include identifying or determining, based on the metadata, second media including an event occurred in the area among the first media. The method may include obtaining, based on the second media, third media including the event and having a FoV different from FoVs of the second media. The method may include storing, in a memory of the electronic device, the third media based on a state that the third media is accessible to at least one of the external electronic devices.

For example, the obtaining the meta data may include identifying or determining a location where the event occurred in the area based on the second media.

For example, the obtaining the third media may include obtaining, based on directions of FoVs of each of the second media indicated by the metadata, the third media having the FoV towards the identified or determined location.

For example, the storing may include storing the second media and the third media associated with the event in the memory.

For example, the method may further include, in response to receiving a signal for searching media associated with at least one of the area or the event, transmitting, to an external electronic device, a list including the second media and the third media as a response to the signal.

For example, the obtaining the meta data may include obtaining, based on preset categories for classifying the event included in the first media, the metadata indicating at least one event included in each of the first media.

As described above, according to an embodiment, a method of a wearable device may include identifying or determining a location of the wearable device based on data outputted from a sensor of the wearable device. The method may include displaying, in a FoV(field-of-view) of the wearable device, by controlling a display of the wearable device based on identifying that the location is included in a first area set by an external electronic device through a communication circuitry of the wearable device, a visual object for adjusting a state of the camera to a first state for recording media. The method may include adjusting, in response to an input indicating to select the visual object, a state of the camera to the first state. The method may include obtaining, based on identifying or determining that the location is moved into a second area in the first area based on the data, media associated with the second area based on the camera of which state is adjusted to the first state. The method may include transmitting the obtained media to the external electronic device through the communication circuitry.

For example, the transmitting may include identifying or determining, among preset categories for classifying at least one event recorded by the media, at least one category corresponding to the media. The transmitting may include transmitting, to the external electronic device, information indicating the at least one event based on the at least one category with the media.

For example, the transmitting may include identifying or determining, after obtaining the media, another input indicating to input information with respect to the media. The transmitting may include transmitting, to the external electronic device, the media with the information identified or determined by the another input.

For example, the transmitting may include transmitting, to the external electronic device, the media together with information indicating the FoV of the camera while obtaining the media.

For example, the obtaining may include displaying, based on a direction of the camera in the second area identified by the data, a second visual object for guiding the direction of the camera, the second visual object being different from the visual object which is a first visual object, in the FoV through the display.

As described above, according to an embodiment, an electronic device (e.g., the server 110 of FIGS. 5 and 6) may a communication circuitry (e.g., the communication circuitry 650 of FIG. 6), a memory (e.g., the memory 620 of FIG. 6), and a processor (e.g., the processor 610 of FIG. 6). The processor may be configured to obtain, from external electronic devices based on the communication circuitry, first media with respect to an area (e.g., the area 510 of FIG. 5) and metadata corresponding to the first media. The processor may be configured to identify or determine, based on the metadata, second media including an event occurred in the area among the first media. The processor may be configured to obtain, based on the second media, third media including the event and having a FoV different from FoVs of the second media. The processor may be configured to store, in the memory, the third media based on a state that the third media is accessible to at least one of the external electronic devices.

For example, the processor may be configured to identify or determine a location where the event occurred in the area based on the second media.

For example, the processor may be configured to obtain, based on directions of FoVs of each of the second media indicated by the metadata, the third media having the FoV towards the identified or determined location.

For example, the processor may be configured to store the second media and the third media in association with the event in the memory.

For example, the processor may be configured to transmit, in response to receiving a signal for searching media associated with at least one of the area or the event, a list including the second media and the third media as a response to the signal, to an external electronic device.

For example, the processor may be configured to obtain, based on preset categories for classifying the event included in the first media, the metadata indicating at least one event included in each of the first media.

According to an embodiment of the disclosure, a wearable device may comprise a display; a camera; a sensor; a communication circuitry; and a processor. The processor may be configured to identify a location of the wearable device based on data output by the sensor. The processor may be configured to display, in a field-of-view (FoV) of the wearable device, a visual object for adjusting a state of the camera to a first state for recording media, by controlling the display based on identifying that the location is included in a first area that is set by an external electronic device through the communication circuitry. The processor may be configured to adjust, based on an input indicating a selection of the visual object, the state of the camera to the first state. The processor may be configured to identify, based on the data from the sensor, whether the location of the wearable device moves to a second area in the first area. The processor may be configured to obtain, based on identifying that the location of the wearable device moves into the second area, media associated with the second area based on the state of the camera being adjusted to the first state. The processor may be configured to transmit the obtained media to the external electronic device through the communication circuitry.

For example, the processor may be configured to: identify, from a plurality of categories for classifying at least one event recorded by the media, at least one category corresponding to the media; and transmit, to the external electronic device through the communication circuitry, information indicating the at least one event based on the at least one category with the media.

For example, the processor may be configured to transmit, through the communication circuitry, the media to the external electronic device with the data from the sensor for identifying the location.

For example, the processor may be configured to: identify, after obtaining the media, another input indicating to input information with respect to the media; and transmit, to the external electronic device through the communication circuitry, the media with the information identified by the another input.

For example, the processor may be configured to transmit, to the external electronic device through the communication circuitry, the media with information indicating the FoV of the camera while obtaining the media.

For example, the processor may be configured to transmit the media, to the external electronic device through the communication circuitry, based on an input indicating to select a second visual object for transmitting the obtained media, the second visual object being different from the visual object that is a first visual object.

For example, the sensor may be a global positioning system, and the processor may be configured to identify, based on the data output by the sensor, whether a geographic location of the wearable device crosses a border line of the first area.

For example, the processor may be configured to, based on the input, cease, for a predetermined amount of time, controlling of the camera based on another application different from a preset application for obtaining the media.

For example, the processor may be configured to display, based on a direction of the camera in the second area identified by the data from the sensor, a second visual object for guiding the direction of the camera, the second visual object being different from the visual object, which is a first visual object, in the FoV through the display.

According to an embodiment of the disclosure, a method of an electronic device may include obtaining, from a plurality of external electronic devices based on a communication circuitry of the electronic device, first media with respect to an area and metadata corresponding to the first media. The method may include identifying, based on the metadata, second media including an event occurred in the area among the first media. The method may include obtaining, based on the second media, third media including the event and including a FoV different from one or more FoVs of the second media. The method may include storing, in a memory of the electronic device, the third media based on a state that the third media is accessible to at least one of the plurality of external electronic devices.

For example, the obtaining the metadata may include identifying a location where the event occurred in the area based on the second media.

For example, the obtaining the third media may include obtaining, based on directions of the one or more FoVs of each of the second media indicated by the metadata, the third media having the FoV towards the identified location.

For example, the storing may include storing the second media and the third media associated with the event in the memory.

For example, the method may further include, based on to receiving, from a first external electronic device from the plurality of external electronic devices, a signal for searching media associated with at least one of the area or the event, transmitting, to the first external electronic device, a list including the second media and the third media as a response to the signal.

For example, the obtaining the metadata may include obtaining, based on preset categories for classifying the event included in the first media, the metadata indicating at least one event included in each of the first media.

According to an embodiment of the disclosure, a method performed by at least one processor of a wearable device may include identifying a location of the wearable device based on data output by a sensor of the wearable device. The method may include displaying, in a field-of-view (FoV) of the wearable device, by controlling a display of the wearable device based on identifying that the location is included in a first area that is set by an external electronic device through a communication circuitry of the wearable device, a visual object for adjusting a state of a camera to a first state for recording media. The method may include adjusting, based on an input indicating a selection of the visual object, the state of the camera to the first state. The method may include identifying, based on the data from the sensor, whether the location of the wearable device moves to a second area included in the first area. The method may include obtaining, based on identifying that the location of the wearable device moves into the second area, media associated with the second area based on the state of the camera being adjusted to the first state. The method may include transmitting the obtained media to the external electronic device through the communication circuitry.

For example, the transmitting may include: identifying, from a plurality of preset categories for classifying at least one event recorded by the media, at least one category corresponding to the media; and transmitting, to the external electronic device, information indicating the at least one event based on the at least one category with the media.

For example, the transmitting may include: identifying, after the obtaining the media, another input indicating to input information with respect to the media; and transmitting, to the external electronic device, the media with the information identified by the another input.

For example, the transmitting may include transmitting, to the external electronic device, the media together with information indicating the FoV of the camera while obtaining the media.

For example, the obtaining may include displaying, based on a direction of the camera in the second area identified by the data output by the sensor, a second visual object for guiding the direction of the camera, the second visual object being different from the visual object which is a first visual object, in the FoV through the display.

According to an aspect of the disclosure, an electronic device includes a communication circuitry; a memory; and a processor. The processor may be configured to: obtain, from a plurality of external electronic devices based on the communication circuitry, first media with respect to an area and metadata corresponding to the first media. The processor may be configured to identify, based on the metadata, second media including an event occurred in the area among the first media. The processor may be configured to obtain, based on the second media, third media including the event and including a FoV different from one or more FoVs of the second media. The processor may be configured to store, in the memory, the third media based on a state that the third media is accessible to at least one of the plurality of external electronic devices.

For example, the processor may be configured to identify a location where the event is occurred in the area based on the second media.

For example, the processor may be configured to obtain, based on directions of the one or more FoVs of each of the second media indicated by the metadata, the third media having the FoV towards the identified location.

For example, the processor may be configured to store the second media and the third media associated with the event in the memory.

For example, the processor may be configured to, based on receiving a signal, from a first external electronic device from among the plurality of external electronic devices, for searching media associated with at least one of the area or the event, transmit, to the first external electronic device, a list including the second media and the third media as a response to the signal.

For example, the processor may be configured to obtain, based on preset categories for classifying the event included in the first media, the metadata indicating at least one event included in each of the first media.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU(programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In such a case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, or any other memory structure known to one of ordinary skill in the art to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. A wearable device comprising:
a display;
a camera;
a sensor;
communication circuitry;
memory comprising one or more storage media storing instructions; and
at least one processor comprising processing circuitry,
wherein the instructions, when executed by the at least one processor individually or collectively, cause the wearable device to:
receive information regarding a first area and a second area adjacent to the first area,
identify, via the sensor, whether the wearable device is in the first area,
based on identifying the wearable device is in the first area, activate the camera,
while the camera is activated, identify whether the wearable device is moved from the first area to the second area, and
based on identifying the wearable device is moved from the first area to the second area, capture and transmit, to an external electronic device, a video corresponding to a field-of-view (FoV) of the camera including at least a portion of the second area.

2. The wearable device of claim 1, wherein the instructions, when executed by at least one processor individually or collectively, cause the wearable device to:
identify, from a plurality of categories for classifying at least one event occurred in the second area, at least one category corresponding to the video, and
transmit, to the external electronic device through the communication circuitry, information indicating the at least one event based on the at least one category with the video.

3. The wearable device of claim 1, wherein the instructions, when executed by at least one processor individually or collectively, cause the wearable device to:
transmit, through the communication circuitry, the video to the external electronic device with data from the sensor for identifying a location of the wearable device.

4. The wearable device of claim 1, wherein the instructions, when executed by at least one processor individually or collectively, cause the wearable device to:
based on identifying the wearable device is in the first area, display, on the display, a visual object, and
based on an input with respect to the visual object, activate the camera.

5. The wearable device of claim 1, wherein the instructions, when executed by at least one processor individually or collectively, cause the wearable device to:
transmit, to the external electronic device through the communication circuitry, the video with information indicating the FoV of the camera while obtaining the video.

6. The wearable device of claim 1, wherein the instructions, when executed by at least one processor individually or collectively, cause the wearable device to:
transmit the video to the external electronic device through the communication circuitry based on an input with respect to a visual object for transmitting the obtained video.

7. The wearable device of claim 1, wherein the sensor is a global positioning system, and
wherein the instructions, when executed by at least one processor individually or collectively, cause the wearable device to:
identify, based on data output by the sensor, whether a geographic location of the wearable device crosses a border line of the first area.

8. The wearable device of claim 1, wherein the instructions, when executed by at least one processor individually or collectively cause the wearable device to:
based on identifying the wearable device is in the first area in a state in which the camera is activated, display a visual object providing an option to permit transmission of the video, and
based on identifying the wearable device is moved from the first area to the second area after a selection of the option, transmit the video to the external electronic device.

9. The wearable device of claim 1, wherein the instructions, when executed by at least one processor individually or collectively, cause the wearable device to:
display, based on a direction of the camera in the second area identified by data from the sensor, a visual object for guiding the direction of the camera.

10. A method of an electronic device, the method comprising:
obtaining, from a plurality of external electronic devices based on a communication circuitry of the electronic device, first media with respect to an area and metadata corresponding to the first media, wherein the first media comprises a plurality of videos;
identifying, based on the metadata, second media among the first media, the second media including an event occurred in the area;
generating, based on the second media, third media including the event and including a field-of-view (FoV) that is a composite of at least two FoVs of at least two videos from the second media; and
storing, in a memory of the electronic device, the third media based on a state that the third media is accessible to at least one of the plurality of external electronic devices.

11. The method of claim 10, wherein the obtaining the metadata comprises:
identifying a location where the event occurred in the area based on the second media.

12. The method of claim 11, wherein the obtaining the third media comprises:
generating, based on directions of the at least two FoVs of the at least two videos from the second media indicated by the metadata, the third media having the FoV towards the identified location.

13. The method of claim 10, wherein the storing comprises:
storing the second media and the third media associated with the event in the memory.

14. The method of claim 10, further comprising:
based on to receiving, from a first external electronic device from the plurality of external electronic devices, a signal for searching media associated with at least one of the area or the event, transmitting, to the first external electronic device, a list including the second media and the third media as a response to the signal.

15. The method of claim 10, wherein the obtaining the metadata comprises:
obtaining, based on preset categories for classifying the event included in the first media, the metadata indicating at least one event included in each of the first media.

16. A method performed by at least one processor of a wearable device including a display, a camera, and a sensor, the method comprising:
receiving information regarding a first area and a second area adjacent to the first area;
identifying, via the sensor, whether the wearable device is in the first area;
based on identifying the wearable device is in the first area, activating the camera;
while the camera is activated, identifying whether the wearable device is moved from the first area to the second area; and
based on identifying the wearable device is moved from the first area to the second area, capturing and transmitting, to an external electronic device, a video corresponding to a field-of-view (FoV) of the camera including at least a portion of the second area.

17. The method of claim 16, wherein the transmitting comprises:
identifying, from a plurality of preset categories for classifying at least one event occurred in the second area, at least one category corresponding to the video; and
transmitting, to the external electronic device, information indicating the at least one event based on the at least one category with the video.

18. The method of claim 16, wherein the transmitting comprises:
based on identifying the wearable device is in the first area, displaying, on the display, a visual object; and
based on an input with respect to the visual object, activating the camera.

19. The method of claim 16, wherein the transmitting comprises:
transmitting, to the external electronic device, the video together with information indicating the FoV of the camera while obtaining the video.

20. The method of claim 16, wherein the obtaining comprises:
    displaying, based on a direction of the camera in the second area identified by data output by the sensor, a visual object for guiding the direction of the camera.

\* \* \* \* \*